(12) United States Patent
Miller, II et al.

(10) Patent No.: US 10,821,464 B2
(45) Date of Patent: Nov. 3, 2020

(54) COMMON FEED SYSTEM FOR SURFACE TREATMENT AND ADHESIVE APPLICATION

(71) Applicant: The Boeing Company, Chicago, IL (US)

(72) Inventors: Richard Allen Miller, II, Seattle, WA (US); Marcus Anthony Belcher, Sammamish, WA (US); Stephen Howard Williams, Kent, WA (US)

(73) Assignee: The Boeing Company, Chicago, IL (US)

( * ) Notice: Subject to any disclaimer, the term of this patent is extended or adjusted under 35 U.S.C. 154(b) by 614 days.

(21) Appl. No.: 15/626,221

(22) Filed: Jun. 19, 2017

(65) Prior Publication Data

US 2018/0361416 A1 Dec. 20, 2018

(51) Int. Cl.
| | | |
|---|---|---|
| *B05B 13/02* | (2006.01) | |
| *B05D 1/02* | (2006.01) | |
| *C09J 5/02* | (2006.01) | |
| *B29C 59/14* | (2006.01) | |
| *B05D 3/14* | (2006.01) | |
| *B29D 99/00* | (2010.01) | |

(52) U.S. Cl.
CPC ............ *B05B 13/0207* (2013.01); *B05D 1/02* (2013.01); *B05D 3/144* (2013.01); *B29C 59/142* (2013.01); *B29D 99/0003* (2013.01); *C09J 5/02* (2013.01); *B29C 2059/145* (2013.01)

(58) Field of Classification Search
None
See application file for complete search history.

(56) References Cited

U.S. PATENT DOCUMENTS

| | | | | |
|---|---|---|---|---|
| 5,055,317 | A | * | 10/1991 | Hoffman ............. B05B 13/0207 427/282 |
| 5,472,544 | A | * | 12/1995 | Fukamachi .............. B05D 1/16 156/250 |
| 8,632,651 | B1 | | 1/2014 | Hicks et al. |
| 9,067,374 | B2 | | 6/2015 | Schaaf et al. |
| 2007/0074737 | A1 | | 4/2007 | Urena |
| 2011/0223357 | A1 | * | 9/2011 | Umemori ................ B29C 59/14 427/570 |
| 2014/0150964 | A1 | * | 6/2014 | Schaaf .................... B32B 38/18 156/267 |

FOREIGN PATENT DOCUMENTS

CA 2624565 A1 4/2007

* cited by examiner

*Primary Examiner* — Nadine G Norton
*Assistant Examiner* — Bradford M Gates
(74) *Attorney, Agent, or Firm* — Yee & Associates, P.C.

(57) ABSTRACT

A system for treating a surface and applying adhesive to an already treated portion of the surface concurrently is presented. The system comprises surface treatment equipment, adhesive application equipment, and a common feed system. The surface treatment equipment is configured to treat the surface of an elongated member. The adhesive application equipment is configured to apply adhesive to the already treated portion of the surface. The common feed system feeds the elongated member beneath the surface treatment equipment and the adhesive application equipment concurrently.

22 Claims, 10 Drawing Sheets

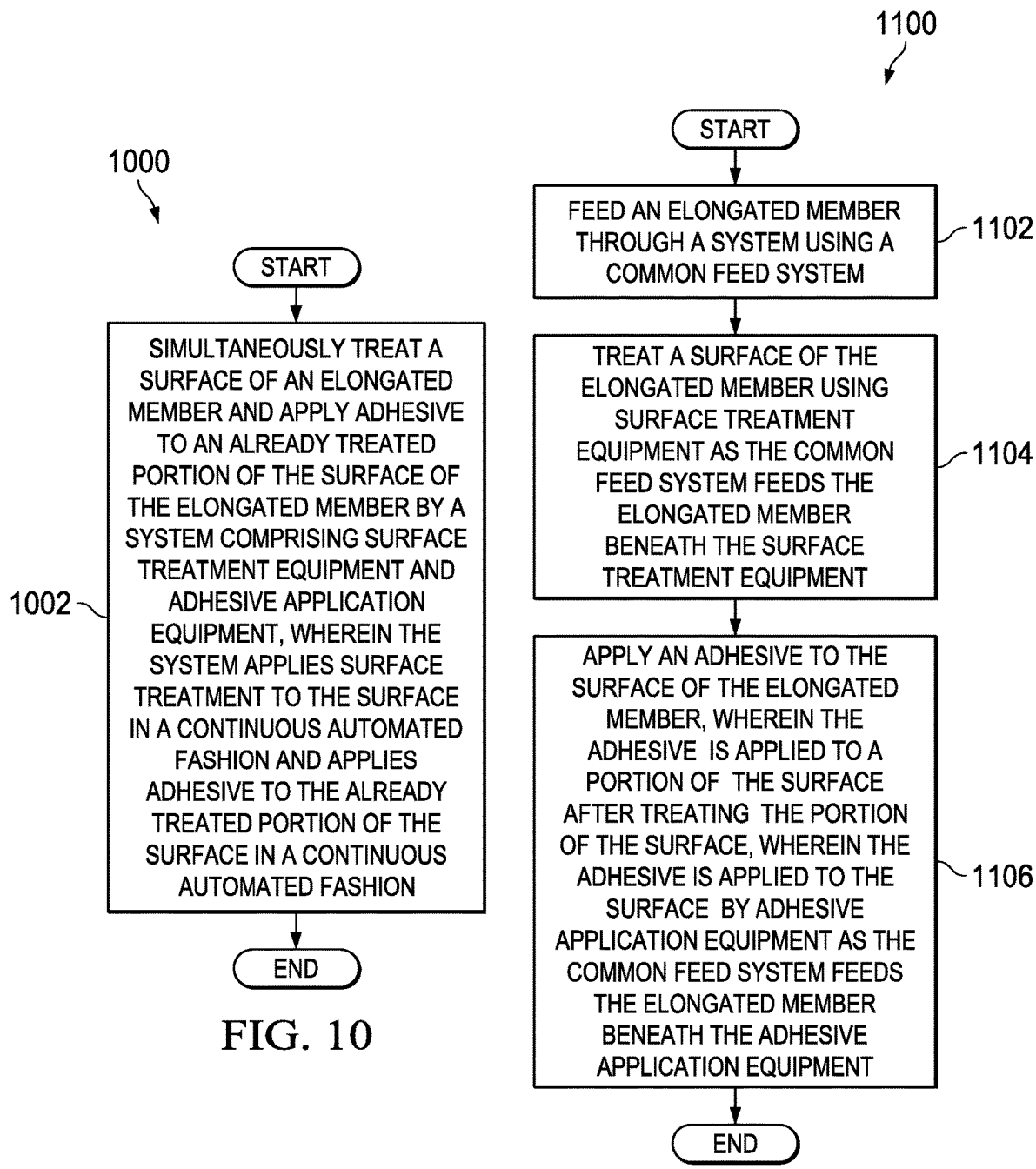

COMMON FEED SYSTEM FOR SURFACE TREATMENT AND ADHESIVE APPLICATION

BACKGROUND INFORMATION

1. Field

The present disclosure relates generally to manufacturing processes, and more specifically, to adhesive application and surface treatment processes. Still more particularly, the present disclosure relates to providing a common feed system for adhesive application equipment and surface treatment equipment.

2. Background

Composite structures may be bonded together using an adhesive layer. Prior to applying the adhesive, the surface of the composite structure may receive a surface treatment, such as treatment of the surface with an atmospheric pressure plasma.

To treat the surface with atmospheric pressure plasma, an atmospheric pressure plasma treatment device travels across the surface of the composite structure. After treating all of the surface with atmospheric pressure plasma, the adhesive layer is applied manually to the surface. The surface of the composite structure is vacuum bagged. Vacuum bagging mitigates air entrapment between the adhesive and the surface of the composite material. Vacuum bagging also results in a desirable amount of tack.

Plasma treatment of the surface and subsequent manual adhesive application may use at least an undesirable amount of time or an undesirable amount of manual labor. Therefore, it would be desirable to have a method and apparatus that takes into account at least some of the issues discussed above, as well as other possible issues.

SUMMARY

An illustrative embodiment of the present disclosure provides a system for treating a surface and applying adhesive to an already treated portion of the surface concurrently. The system comprises surface treatment equipment, adhesive application equipment, and a common feed system. The surface treatment equipment is configured to treat the surface of an elongated member. The adhesive application equipment is configured to apply adhesive to the surface. The common feed system feeds the elongated member beneath the surface treatment equipment and the adhesive application equipment concurrently.

Another illustrative embodiment of the present disclosure provides a method. A surface of an elongated member is simultaneously treated and adhesive is applied to an already treated portion of the surface of the elongated member by a system comprising surface treatment equipment and adhesive application equipment, wherein the system applies surface treatment to the surface in a continuous automated fashion and applies adhesive to the already treated portion of the surface in a continuous automated fashion.

A further illustrative embodiment of the present disclosure provides a method. An elongated member is fed through a system using a common feed system. A surface of the elongated member is treated using surface treatment equipment as the common feed system feeds the elongated member beneath the surface treatment equipment. An adhesive is applied to the surface of the elongated member, wherein the adhesive is applied to a portion of the surface after treating the portion of the surface, wherein the adhesive is applied to the surface by adhesive application equipment as the common feed system feeds the elongated member beneath the adhesive application equipment.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed to be characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 10 is an illustration of a flowchart of a method for processing an elongated member in accordance with an illustrative embodiment;

FIG. 11 is an illustration of a flowchart of a method for processing an elongated member in accordance with an illustrative embodiment;

DETAILED DESCRIPTION

The illustrative embodiments recognize and take into account one or more different considerations. For example, the illustrative embodiments recognize and take into account that when a structure is sent through mounted processing equipment the equipment may be referred to as a "pass-through" processing system. The illustrative embodiments recognize and take into account that when a structure is stationary and processing equipment is passed over the structure, the equipment may be referred to as a "pass-over" processing system.

The illustrative embodiments recognize and take into account that a pass-through processing system requires a larger processing footprint than equipment moving across a structure. The illustrative embodiments recognize and take into account that this processing footprint takes into account not only the physical size of the equipment, but also the distance the structure travels.

The illustrative embodiments recognize and take into account that a pass-through processing system has at least a length double the length of the structure receiving processing. For example, the illustrative examples recognize and take into account that a feedline for a ninety foot long elongated structure in a pass-through processing system would have an over one hundred and eighty foot long footprint to accommodate the elongated structure prior to and after processing.

The illustrative examples recognize and take into account that "pass-over" processing system has a smaller footprint than a "pass-through" processing system. The illustrative embodiments recognize and take into account that when equipment moves across a structure, the structure represents the footprint within the manufacturing environment. For example, the illustrative examples recognize and take into account that a feedline for a ninety foot long elongated structure in a pass-over processing system would have about a ninety foot long footprint to accommodate the elongated structure and the processing equipment that travels over the structure.

The illustrative examples recognize and take into account that in conventional processing, composites receive two independent steps: initial surface preparation followed by subsequent manual adhesive application. The illustrative examples recognize and take into account that conventional processes may require an undesirable amount of manual labor. The illustrative examples further recognize and take into account that manually laying down an adhesive presents a potential of inducing inconsistencies due to pick-and-place operations between each step, as well as a reduced rate due to both of the extra steps.

Figure 1:
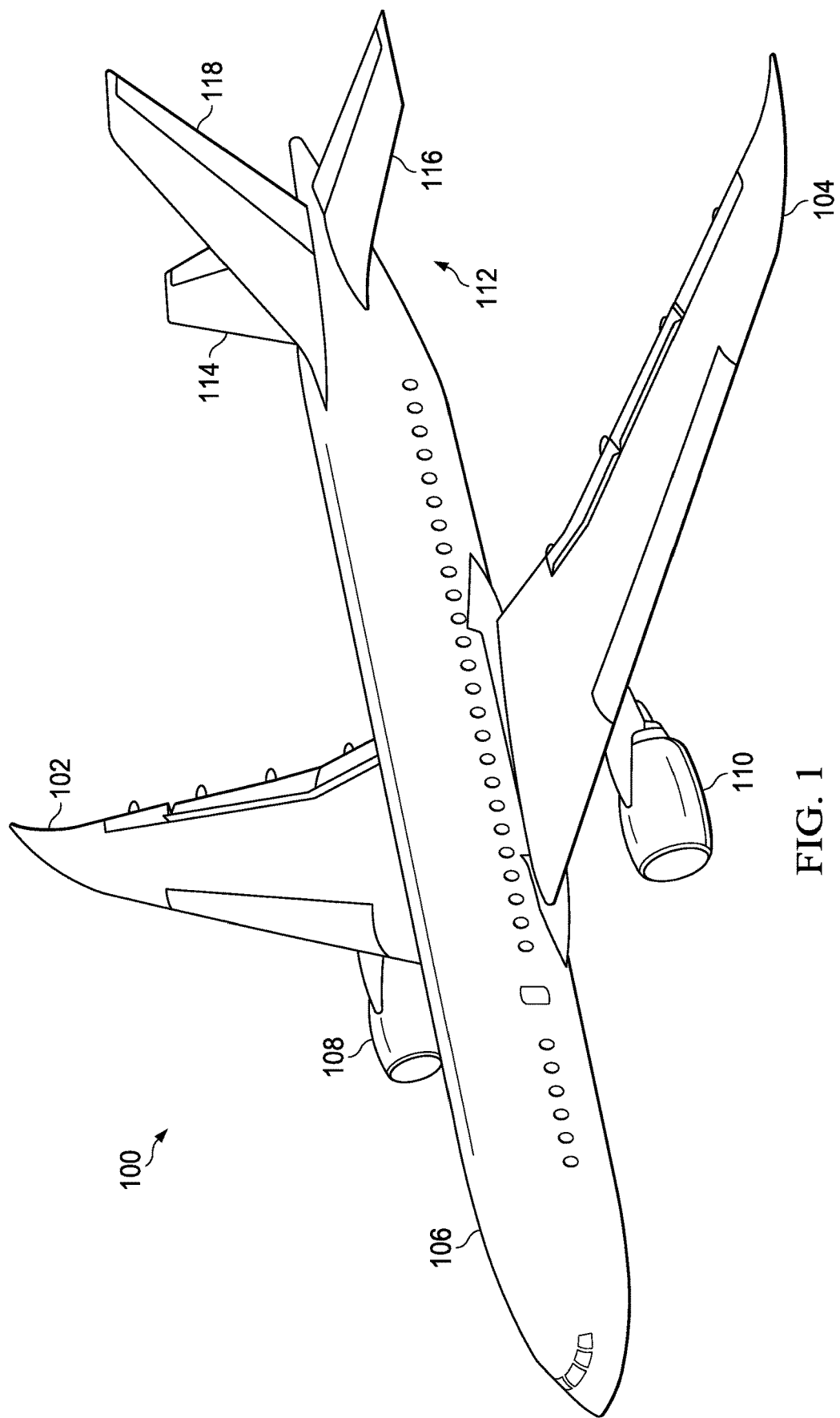
FIG. 1 is an illustration of an aircraft in which an illustrative embodiment may be implemented.

Referring now to the figures, and in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

Aircraft 100 is an environment in which at least one elongated member processed using an illustrative embodiment may be implemented. For example, a stringer, in at least one of body 106, wing 102, or wing 104, may be processed using a common feed system for surface treatment and adhesive application.

This illustration of aircraft 100 is provided for the purposes of illustrating one environment in which different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, rotorcraft, or other suitable types of aircraft.

Although the illustrative examples for an illustrative embodiment are described with respect to an aircraft, the illustrative embodiments may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable types of structures.

Figure 2:
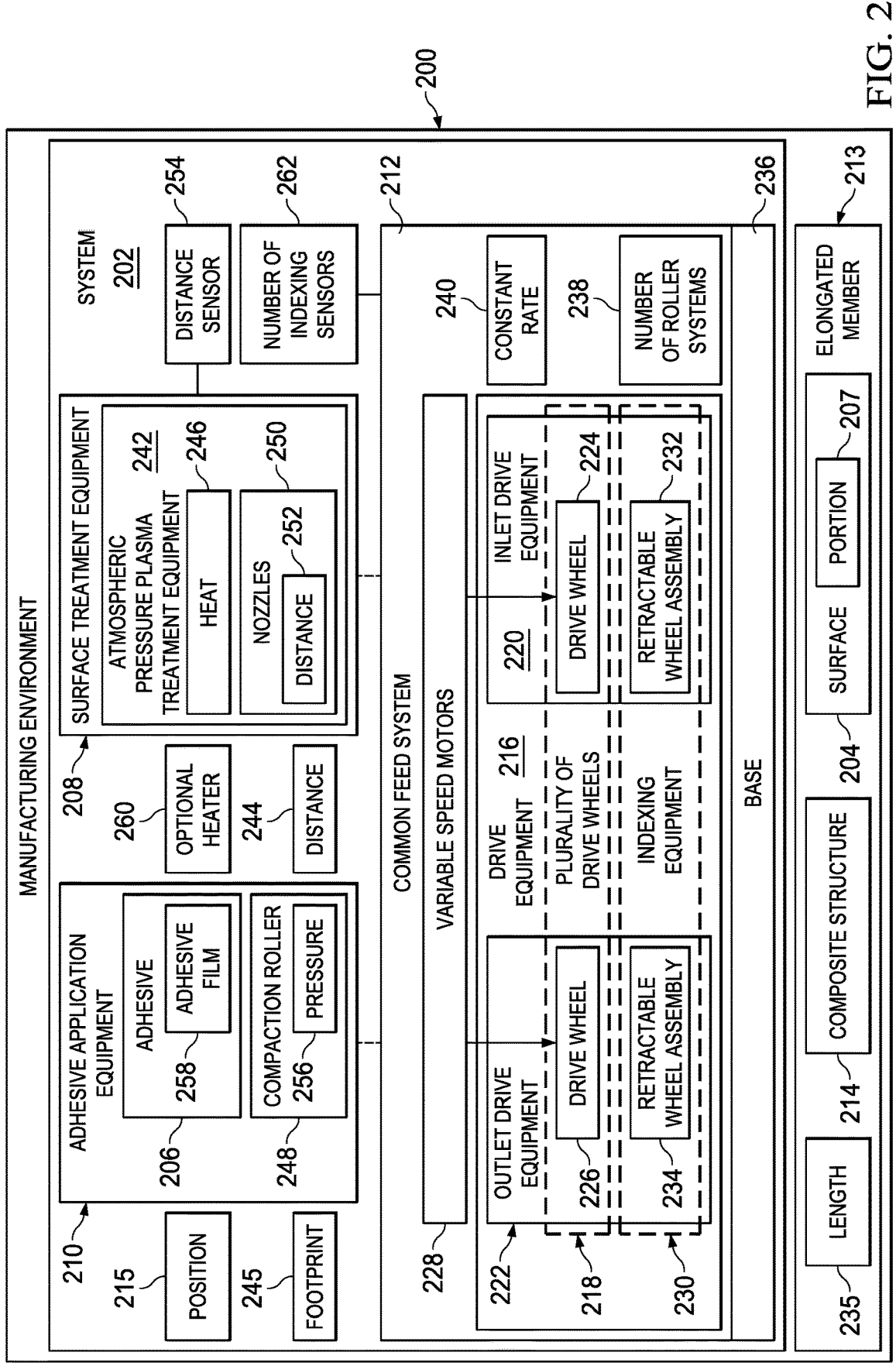
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is a depiction of an environment in which surface treatment and adhesive application may be performed. Surface treatment and adhesive may be applied to a stringer of aircraft 100 of FIG. 1 in manufacturing environment 200.

System 202 for treating surface 204 and applying adhesive 206 to already treated portion 207 of surface 204 concurrently is present in manufacturing environment 200. System 202 comprises surface treatment equipment 208, adhesive application equipment 210, and common feed system 212. Surface treatment equipment 208 is configured to treat surface 204 of elongated member 213. Adhesive application equipment 210 is configured to apply adhesive 206 to already treated portion 207 of surface 204. Common feed system 212 feeds elongated member 213 beneath surface treatment equipment 208 and adhesive application equipment 210 concurrently. System 202 comprises common feed system 212 for feeding elongated member 213 beneath surface treatment equipment 208 and adhesive application equipment 210 concurrently. Common feed system 212 for feeding elongated member 213 beneath surface treatment equipment 208 and adhesive application equipment 210 concurrently feeds elongated member 213 beneath surface treatment equipment 208 and adhesive application equipment 210 at a common rate.

In some illustrative examples, elongated member 213 is composite structure 214. When elongated member 213 is composite structure 214, adhesive 206 is used to bond composite structure 214 to another composite structure after application of adhesive 206 and removal of elongated member 213 from system 202.

System 202 is located at position 215 in manufacturing environment 200. System 202 does not change position 215 within manufacturing environment 200 to process elongated member 213. Elongated member 213 is sent through system 202. Adhesive application equipment 210 is mounted. Surface treatment equipment 208 is mounted. Common feed system 212 feeds elongated member 213 through both adhesive application equipment 210 and surface treatment equipment 208.

Common feed system 212 has drive equipment 216 comprising plurality of drive wheels 218 configured to contact elongated member 213. As depicted, drive equipment 216 includes inlet drive equipment 220 and outlet drive equipment 222. Plurality of drive wheels 218 includes drive wheel 224 of inlet drive equipment 220 and drive wheel 226 of outlet drive equipment 222.

Plurality of drive wheels 218 contact elongated member 213 to impart force to drive elongated member 213 along common feed system 212. Each of drive wheel 224 and drive wheel 226 is connected to a respective variable speed motor of variable speed motors 228. Variable speed motors 228 rotate drive wheel 224 and drive wheel 226 to impart force to drive elongated member 213 along common feed system 212.

Plurality of drive wheels 218 act to at least one of push or pull elongated member through system 202. Plurality of drive wheels 218 may include any desirable quantity of drive wheels. Although only a single drive wheel is shown in each of inlet drive equipment 220 and outlet drive equipment 222, more than one drive wheel may be present in at least one of inlet drive equipment 220 or outlet drive equipment 222.

Inlet drive equipment 220 and outlet drive equipment 222 are positioned at any desirable location in common feed system 212. Each of inlet drive equipment 220 and outlet drive equipment 222 are placed in any desirable location relative to adhesive application equipment 210 and surface treatment equipment 208.

Common feed system 212 further comprises indexing equipment 230 configured to center elongated member 213 beneath surface treatment equipment 208 and adhesive application equipment 210. Indexing equipment 230 comprises retractable wheel assembly 232 configured to move towards or away from drive wheel 224 of drive equipment 216. Retractable wheel assembly 234 of indexing equipment 230 is configured to move towards or away from drive wheel 226 of drive equipment 216.

Indexing equipment 230 centers elongated member 213 in a horizontal plane. The horizontal plane is perpendicular to a centerline running through length 235 of elongated member 213. Common feed system 212 is associated with base 236. The horizontal plane is parallel to a face of base 236.

Common feed system 212 further comprises number of roller systems 238 to support elongated member 213. Number of roller systems 238 center elongated member 213 in a vertical plane. The vertical plane is perpendicular to the centerline running through length 235 of elongated member 213. The vertical plane is perpendicular to a face of base 236.

Number of roller systems 238 is laid out based on a design of elongated member 213. For example, at least one of a quantity of roller systems, a size of rollers, a position of rollers, a quantity of rollers in each roller system, a position of roller systems, or any other desirable feature of number of roller systems 238 is selected based on a cross-sectional shape of elongated member 213. Number of roller systems 238 may be configured to support a plurality of different designs of elongated members, including elongated member 213.

Alignment and calibration features, such as indexing equipment 230 and number of roller systems 238, are included in common feed system 212 to position elongated member 213. All mechanical components of system 202 interact accordingly to process elongated member 213 for both treatment of surface 204 and placement of adhesive 206 in a desired fashion. System 202 is designed and fabricated to execute the two processes immediately consecutively at a single rate.

Adhesive application equipment 210 is mounted within manufacturing environment 200. Surface treatment equipment 208 is also mounted within manufacturing environment 200. The alignment of the two systems, adhesive application equipment 210 and surface treatment equipment 208, into one common drive system, drive equipment 216, is key so that the surface treatment is applied to surface 204 with adequate coverage and that the immediately subsequent application process of adhesive 206 aligns and places adhesive 206 centered on surface 204.

Common feed system 212 feeds elongated member 213 through system 202 at constant rate 240. Constant rate 240 is selected to provide desirable processing from both adhesive application equipment 210 and surface treatment equipment 208. In some illustrative examples, adhesive application equipment 210 has an independent traversal rate of between one inch per second and ten inches per second. In some illustrative examples, adhesive application equipment 210 has an independent traversal rate of between one inch per second and eight inches per second. In some illustrative examples, adhesive application equipment 210 has an independent traversal rate of between three inches per second and eight inches per second. In some illustrative examples, adhesive application equipment 210 has an independent traversal rate of between one inch per second and six inches per second. In some illustrative examples, adhesive application equipment 210 independently has a desirable independent traversal rate of equal to or less than five inches per second. In some illustrative examples, adhesive application equipment 210 has a desirable independent traversal rate of approximately five inches per second.

In some illustrative examples, surface treatment equipment 208 has an independent traversal rate of between one inch per second and six inches per second. In some illustrative examples, surface treatment equipment 208 has an independent traversal rate of between four inches per second and six inches per second. In some illustrative examples, surface treatment equipment 208 has a desirable independent traversal rate of approximately five inches per second.

In some illustrative examples, common feed system 212 feeds elongated member 213 beneath surface treatment equipment 208 and adhesive application equipment 210 at a rate in a range of one inches per second to ten inches per second. In some more specific illustrative examples, common feed system 212 feeds elongated member 213 beneath surface treatment equipment 208 and adhesive application equipment 210 at a rate in a range of three inches per second to eight inches per second. In some illustrative examples, common feed system 212 feeds elongated member 213 beneath surface treatment equipment 208 and adhesive application equipment 210 at a rate in a range of one inch per second to six inches per second. In some illustrative examples, common feed system 212 feeds elongated member 213 beneath surface treatment equipment 208 and adhesive application equipment 210 at a rate in a range of five inches per second to six inches per second. In one illustrative example, common feed system 212 desirably feeds elongated member 213 beneath surface treatment equipment 208 and adhesive application equipment 210 at a rate of approximately five inches per second.

In some illustrative examples, surface treatment equipment 208 comprises atmospheric pressure plasma treatment equipment 242. Atmospheric pressure plasma treatment equipment 242 applies atmospheric pressure plasma to surface 204.

Distance 244 is between surface treatment equipment 208 and adhesive application equipment 210 along common feed system 212. Decreasing distance 244 may reduce inconsistencies in the application of adhesive 206. Decreasing distance 244 may also reduce footprint 245 of system 202.

In some illustrative examples, footprint 245 is only the surface area of manufacturing environment 200 covered by system 202. In some other illustrative examples, footprint 245 is considered to be the surface area including the length for loading elongated member 213 into system 202 and the length for unloading elongated member 213 from system 202.

In some illustrative examples, distance 244 between atmospheric pressure plasma treatment equipment 242 and adhesive application equipment 210 is sufficiently small, such that heat 246 generated on surface 204 by atmospheric pressure plasma treatment equipment 242 increases the tack of adhesive 206. In some illustrative examples, atmospheric pressure plasma treatment equipment 242 is configured such that heat 246 generated on surface 204 is between 105 degrees Fahrenheit and 140 degrees Fahrenheit. In some illustrative examples, atmospheric pressure plasma treatment equipment 242 is configured such that heat 246 generated on surface 204 is desirably at least 122 degrees Fahrenheit.

In some illustrative examples, there is no intervening interface between surface treatment equipment 208 and adhesive application equipment 210. In some illustrative examples, surface treatment equipment 208 and adhesive application equipment 210 are immediately consecutive with the placement of adhesive 206 occurring virtually immediately after surface treatment.

Distance 244 is measured from the location of applying adhesive 206 to the location of applying the surface treatment. Distance 244 is measured from a contact point of compaction roller 248 to nozzles 250 of atmospheric pressure plasma treatment equipment 242.

Distance 244 may have physical limitations based on the design of surface treatment equipment 208 and adhesive application equipment 210. Distance 244 may be desirably minimized by taking into account the design of both surface treatment equipment 208 and adhesive application equipment 210. In some illustrative examples, distance 244 is in the range of about eight inches to about ten inches.

Having distance 244 be as short as possible allows adhesive application equipment 210 to benefit from heat 246 generated by atmospheric pressure plasma treatment equipment 242. Heat 246 causes placement of adhesive 206 to be easier at higher rates. Further, fewer foreign object debris or other inconsistencies may be induced in adhesive 206 when distance 244 is reduced.

When surface treatment equipment 208 takes the form of atmospheric pressure plasma treatment equipment 242, nozzles 250 have desirable processing ranges. The processing characteristics for nozzles 250 include at least one of a pressure at nozzles 250, a speed of nozzles 250, an offset of nozzles 250, an overlap of nozzles 250, or nozzles 250 to surface parallelism.

In some illustrative examples, pressure at nozzles 250 includes measures of input pressure and output pressure. In some illustrative examples, the input pressure for nozzles 250 is in the range of about 50 psi to about 90 psi. In some illustrative examples, the output pressure for nozzles 250 is about 25 psi.

In some illustrative examples, the speed of nozzles 250 in rotations per minute (rpm) is desirably in the range of 2400 rpm to 3200 rpm. In some illustrative examples, the speed of nozzles 250 is desirably 2800 rpm.

In some illustrative examples, distance 252 of nozzles 250 from surface 204 is 0.50 inches ±0.10 inches. Distance sensor 254 of system 202 measures the vertical location of elongated member 213. Measurements from distance sensor 254 are used to move surface treatment equipment 208 vertically, relative to base 236, so that distance 252 is within a desirable range.

In some illustrative examples, the overlap of nozzles 250 is set at 0.20 inches, ±0.05 inches. In some illustrative examples, parallelism of nozzles 250 to surface 204 is 0 degrees, ±10 degrees. The axis of each nozzle of nozzles 250 is desirably normal to surface 204 being treated. The plane of surface treatment is thus parallel, or 0 degrees, to surface 204 receiving treatment. Parallelism is a measure of parallelism of the surface treatment provided by nozzles 250 relative to surface 204.

In some illustrative examples, compaction roller 248 applies pressure 256 in the range of 35 psi to 55 psi. In some other more specific illustrative examples, compaction roller 248 applies pressure 256 in the range of 40 psi to 50 psi. In some other more specific illustrative examples, compaction roller 248 applies pressure 256 in the range of 40 psi to 50 psi. In one illustrative example, compaction roller 248 desirably applies pressure 256 at approximately 45 psi.

In some illustrative examples, adhesive 206 takes the form of adhesive film 258. In some illustrative examples, when adhesive 206 is adhesive film 258, vacuum of 18 to 24 inches of Hg and preferably 22 inches of Hg is provided for a feed and cut sequence of adhesive application equipment 210.

Applied heat increases the tack of adhesive 206. The applied heat may come from any desirable source. The applied heat may be heat within manufacturing environment 200, heat on surface 204, or heat applied by optional heater 260. When present, heat 246 generated by atmospheric pressure plasma treatment equipment 242 increases the tack of adhesive 206. When surface treatment equipment 208 takes a different form, optional heater 260 may be used to increase the tack of adhesive 206. A desirable temperature for adhesive 206 is in the range of 105 degrees Fahrenheit to 140 degrees Fahrenheit. In one illustrative example, the temperature for adhesive 206 is about 122 degrees Fahrenheit. A temperature for adhesive 206 is selected such that adhesive 206 provides sufficient tack at constant rate 240.

To hold elongated member 213 within common feed system 212, elongated member 213 is clamped up. The system clamp up of elongated member 213 is in the range of 65 psi to 95 psi. In some illustrative examples, the clamp up is preferably about 80 psi. Elongated member 213 is clamped to prevent a significant amount of slipping. As length 235 of elongated member 213 increases, slippage also increases.

Number of indexing sensors 262 is provided to determine the end of elongated member 213. To provide accurate processing, system 202 should always track where the ends of elongated member 213 are located.

In some illustrative examples, common feed system 212 feeds elongated member 213 beneath surface treatment equipment 208 and adhesive application equipment 210 at a rate in a range of one inch per second to ten inches per second and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of one inch per second to six inches per second and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of one inch per second to six inches per second and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of three inches per second to eight inches per second and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of three inches per second to eight inches per second and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inch per second to six inches per second and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of five inches per second to six inches per second and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of five inches per second to six inches per second and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of five inches per second to six inches per second and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate of approximately five inches per second and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate of approximately five inches per second and compaction roller 248 of adhesive application equipment 210 applies pressure 256 in the range of 40 psi to 50 psi.

In one specific illustrative example, common feed system 212 feeds elongated member 213 beneath surface treatment equipment 208 and adhesive application equipment 210 at a rate of approximately five inches per second and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inches per second to ten inches per second, input pressure for nozzles 250 of surface treatment equipment 208 is in the range of about 50 psi to about 90 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, input pressure for nozzles 250 of surface treatment equipment 208 is in the range of about 50 psi to about 90 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, input pressure for nozzles 250 of surface treatment equipment 208 is in the range of about 50 psi to about 90 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of three inches per second to eight inches per second, input pressure for nozzles 250 of surface treatment equipment 208 is in the range of about 50 psi to about 90 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inch per second to six inches per second, input pressure for nozzles 250 of surface treatment equipment 208 is in the range of about 50 psi to about 90 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of one inch per second to six inches per second, input pressure for nozzles 250 of surface treatment equipment 208 is in the range of about 50 psi to about 90 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of one inch per second to six inches per second, input pressure for nozzles 250 of surface treatment equipment 208 is in the range of about 50 psi to about 90 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of five inches per second to six inches per second, input pressure for nozzles 250 of surface treatment equipment 208 is in the range of about 50 psi to about 90 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of five inches per second to six inches per second, input pressure for nozzles 250 of surface treatment equipment 208 is in the range of about 50 psi to about 90 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of five inches per second to six inches per second, input pressure for nozzles 250 of surface treatment equipment 208 is in the range of about 50 psi to about 90 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate of approximately five inches per second, input pressure for nozzles 250 of surface treatment equipment 208 is in the range of about 50 psi to about 90 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate of approximately five inches per second, input pressure for nozzles 250 of surface treatment equipment 208 is in the range of about 50 psi to about 90 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate of approximately five inches per second, input pressure for nozzles 250 of surface treatment equipment 208 is in the range of about 50 psi to about 90 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inches per second to ten inches per second, the speed of nozzles 250 of surface treatment equipment 208 in rpm is in the range of 2400 rpm to 3200 rpm, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, the speed of nozzles 250 of surface treatment equipment 208 in rpm is in the range of 2400 rpm to 3200 rpm, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, the speed of nozzles 250 of surface treatment equipment 208 in rpm is in the range of 2400 rpm to 3200 rpm, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of three inches per second to eight inches per second, the speed of nozzles 250 of surface treatment equipment 208 in rpm is in the range of 2400 rpm to 3200 rpm, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inch per second to six inches per second, the speed of nozzles 250 of surface treatment equipment 208 in rpm is in the range of 2400 rpm to 3200 rpm, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of one inch per second to six inches per second, the speed of nozzles 250 of surface treatment equipment 208 in rpm is in the range of 2400 rpm to 3200 rpm, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of one inch per second to six inches per second, the speed of nozzles 250 of surface treatment equipment 208 in rpm is in the range of 2400 rpm to 3200 rpm, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of five inches per second to six inches per second, the speed of nozzles 250 of surface treatment equipment 208 in rpm is in the range of 2400 rpm to 3200 rpm, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of five inches per second to six inches per second, the speed of nozzles 250 of surface treatment equipment 208 in rpm is in the range of 2400 rpm to 3200 rpm, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of five inches per second to six inches per second, the speed of nozzles 250 of surface treatment equipment 208 in rpm is in the range of 2400 rpm to 3200 rpm, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate of approximately five inches per second, the speed of nozzles 250 of surface treatment equipment 208 in rpm is in the range of 2400 rpm to 3200 rpm, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate of approximately five inches per second, the speed of nozzles 250 of surface treatment equipment 208 in rpm is in the range of 2400 rpm to 3200 rpm, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate of approximately five inches per second, the speed of nozzles 250 of surface treatment equipment 208 in rpm is in the range of 2400 rpm to 3200 rpm, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inches per second to ten inches per second, the speed of nozzles 250 of surface treatment equipment 208 in rpm is desirably 2800 rpm, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, the speed of nozzles 250 of surface treatment equipment 208 in rpm is desirably 2800 rpm, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, the speed of nozzles 250 of surface treatment equipment 208 in rpm is desirably 2800 rpm, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of three inches per second to eight inches per second, the speed of nozzles 250 of surface treatment equipment 208 in rpm is desirably 2800 rpm, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of five inches per second to six inches per second, the speed of nozzles 250 of surface treatment equipment 208 in rpm is desirably 2800 rpm, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of five inches per second to six inches per second, the speed of nozzles 250 of surface treatment equipment 208 in rpm is desirably 2800 rpm, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of five inches per second to six inches per second, the speed of nozzles 250 of surface treatment equipment 208 in rpm is desirably 2800 rpm, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate of approximately five inches per second, the speed of nozzles 250 of surface treatment equipment 208 in rpm is desirably 2800 rpm, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate of approximately five inches per second, the speed of nozzles 250 of surface treatment equipment 208 in rpm is desirably 2800 rpm, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate of approximately five inches per second, the speed of nozzles 250 of surface treatment equipment 208 in rpm is desirably 2800 rpm, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inches per second to ten inches per second, the system clamp up of elongated member 213 is in the range of 65 psi to 95 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, the system clamp up of elongated member 213 is in the range of 65 psi to 95 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, the system clamp up of elongated member 213 is in the range of 65 psi to 95 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of three inches per second to eight inches per second, the system clamp up of elongated member 213 is in the range of 65 psi to 95 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inch per second to six inches per second, the system clamp up of elongated member 213 is in the range of 65 psi to 95 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of one inch per second to six inches per second, the system clamp up of elongated member 213 is in the range of 65 psi to 95 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of one inches per second to six inches per second, the system clamp up of elongated member 213 is in the range of 65 psi to 95 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of five inches per second to six inches per second, the system clamp up of elongated member 213 is in the range of 65 psi to 95 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of five inches per second to six inches per second, the system clamp up of elongated member 213 is in the range of 65 psi to 95 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of five inches per second to six inches per second, the system clamp up of elongated member 213 is in the range of 65 psi to 95 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate of approximately five inches per second, the system clamp up of elongated member 213 is in the range of 65 psi to 95 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate of approximately five inches per second, the system clamp up of elongated member 213 is in the range of 65 psi to 95 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate of approximately five inches per second, the system clamp up of elongated member 213 is in the range of 65 psi to 95 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inches per second to ten inches per second, the system clamp up of elongated member 213 is desirably about 80 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, the system clamp up of elongated member 213 is desirably about 80 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, the system clamp up of elongated member 213 is desirably about 80 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of three inches per second to eight inches per second, the system clamp up of elongated member 213 is desirably about 80 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of five inches per second to six inches per second, the system clamp up of elongated member 213 is desirably about 80 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of five inches per second to six inches per second, the system clamp up of elongated member 213 is desirably about 80 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of five inches per second to six inches per second, the system clamp up of elongated member 213 is desirably about 80 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate of approximately five inches per second, the system clamp up of elongated member 213 is desirably about 80 psi, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate of approximately five inches per second, the system clamp up of elongated member 213 is desirably about 80 psi, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate of approximately five inches per second, the system clamp up of elongated member 213 is desirably about 80 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inches per second to ten inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of three inches per second to eight inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of three inches per second to eight inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inch per second to six inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of one inch per second to six inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of one inch per second to six inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of five inches per second to six inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of five inches per second to six inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate in a range of five inches per second to six inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate of approximately five inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate of approximately five inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate of approximately five inches per second, surface treatment equipment 208 is configured such that heat 246 generated on surface 204 of elongated member 213 is between 105 degrees Fahrenheit and 140 degrees Fahrenheit, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate of approximately five inches per second, surface treatment equipment 208 is configured such that heat 246 generated on surface 204 of elongated member 213 is about 120 degrees Fahrenheit, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate of approximately five inches per second, surface treatment equipment 208 is configured such that heat 246 generated on surface 204 of elongated member 213 is between 105 degrees Fahrenheit and 140 degrees Fahrenheit, the input pressure for nozzles 250 of surface treatment equipment 208 is in the range of about 50 psi to about 90 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate of approximately five inches per second, surface treatment equipment 208 is configured such that heat 246 generated on surface 204 of elongated member 213 is between 105 degrees Fahrenheit and 140 degrees Fahrenheit, the speed of nozzles 250 of surface treatment equipment 208 in rpm is in the range of 2400 rpm to 3200 rpm, the input pressure for nozzles 250 is in the range of about 50 psi to about 90 psi, and compaction roller 248 of adhesive application equipment 210 applies pressure 256 at approximately 45 psi.

In some illustrative examples, common feed system 212 feeds elongated member 213 beneath surface treatment equipment 208 and adhesive application equipment 210 at a rate in a range of one inch per second to ten inches per second, surface treatment equipment 208 is configured such that heat 246 generated on surface 204 of elongated member 213 is between 105 degrees Fahrenheit and 140 degrees Fahrenheit, the speed of nozzles 250 of surface treatment equipment 208 in rpm is in the range of 2400 rpm to 3200 rpm, the input pressure for nozzles 250 is in the range of about 50 psi to about 90 psi, the system clamp up of elongated member 213 is in the range of 65 psi to 95 psi, distance 252 of nozzles 250 from surface 204 is 0.50 inches ±0.10 inches, the overlap of nozzles 250 is set at 0.20 inches, ±0.05 inches, vacuum of 18 to 24 inches of Hg is provided for a feed and cut sequence of adhesive application equipment 210, and compaction roller 248 of adhesive application equipment 210 applies pressure 256 in the range of 35 psi to 55 psi.

In some illustrative examples, common feed system 212 feeds elongated member 213 beneath surface treatment equipment 208 and adhesive application equipment 210 at a rate in a range of five inches per second to six inches per second, surface treatment equipment 208 is configured such that heat 246 generated on surface 204 of elongated member 213 is between 105 degrees Fahrenheit and 140 degrees Fahrenheit, the speed of nozzles 250 of surface treatment equipment 208 in rpm is in the range of 2400 rpm to 3200 rpm, the input pressure for nozzles 250 is in the range of about 50 psi to about 90 psi, the system clamp up of elongated member 213 is in the range of 65 psi to 95 psi, distance 252 of nozzles 250 from surface 204 is 0.50 inches ±0.10 inches, the overlap of nozzles 250 is set at 0.20 inches, ±0.05 inches, vacuum of 18 to 24 inches of Hg is provided for a feed and cut sequence of adhesive application equipment 210, and compaction roller 248 of adhesive application equipment 210 applies pressure 256 in the range of 40 psi to 50 psi.

In some illustrative examples, common feed system 212 feeds elongated member 213 beneath surface treatment equipment 208 and adhesive application equipment 210 at a rate of approximately five inches per second, surface treatment equipment 208 is configured such that heat 246 generated on surface 204 of elongated member 213 is about 122 degrees Fahrenheit, the speed of nozzles 250 of surface treatment equipment 208 in rpm is about 2800 rpm, the input pressure for nozzles 250 is in the range of about 50 psi to about 90 psi, the system clamp up of elongated member 213 is approximately 80 psi, distance 252 of nozzles 250 from surface 204 is 0.50 inches ±0.10 inches, the overlap of nozzles 250 is set at 0.20 inches, ±0.05 inches, vacuum of about 22 inches of Hg provided for a feed and cut sequence of adhesive application equipment 210, and compaction roller 248 of adhesive application equipment 210 applies pressure 256 at approximately 45 psi.

The illustration of manufacturing environment 200 in FIG. 2 is not meant to imply physical or architectural limitations to the manner in which an illustrative embodiment may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

For example, adhesive application equipment 210 may have additional components not depicted in FIG. 2. In some illustrative examples, optional profile cutters are present. In some illustrative examples, optional profile cutters are not present. Depending upon an implementation, elongated member 213 may not require a net cut edge.

With reference now to FIGS. 3-6, components of a system for treating a surface and applying adhesive to an already treated portion of the surface are depicted. The simplified views in FIGS. 3-6 are shown independent of many associated utilities or mechanical supports. FIGS. 3-6 are intended to provide a basic depiction of one illustrative example of a system for treating a surface and applying adhesive to an already treated portion of the surface. In operation, the system of FIGS. 3-6 would be associated with at least one of electrical lines, communication lines, or a support table.

Figure 3:
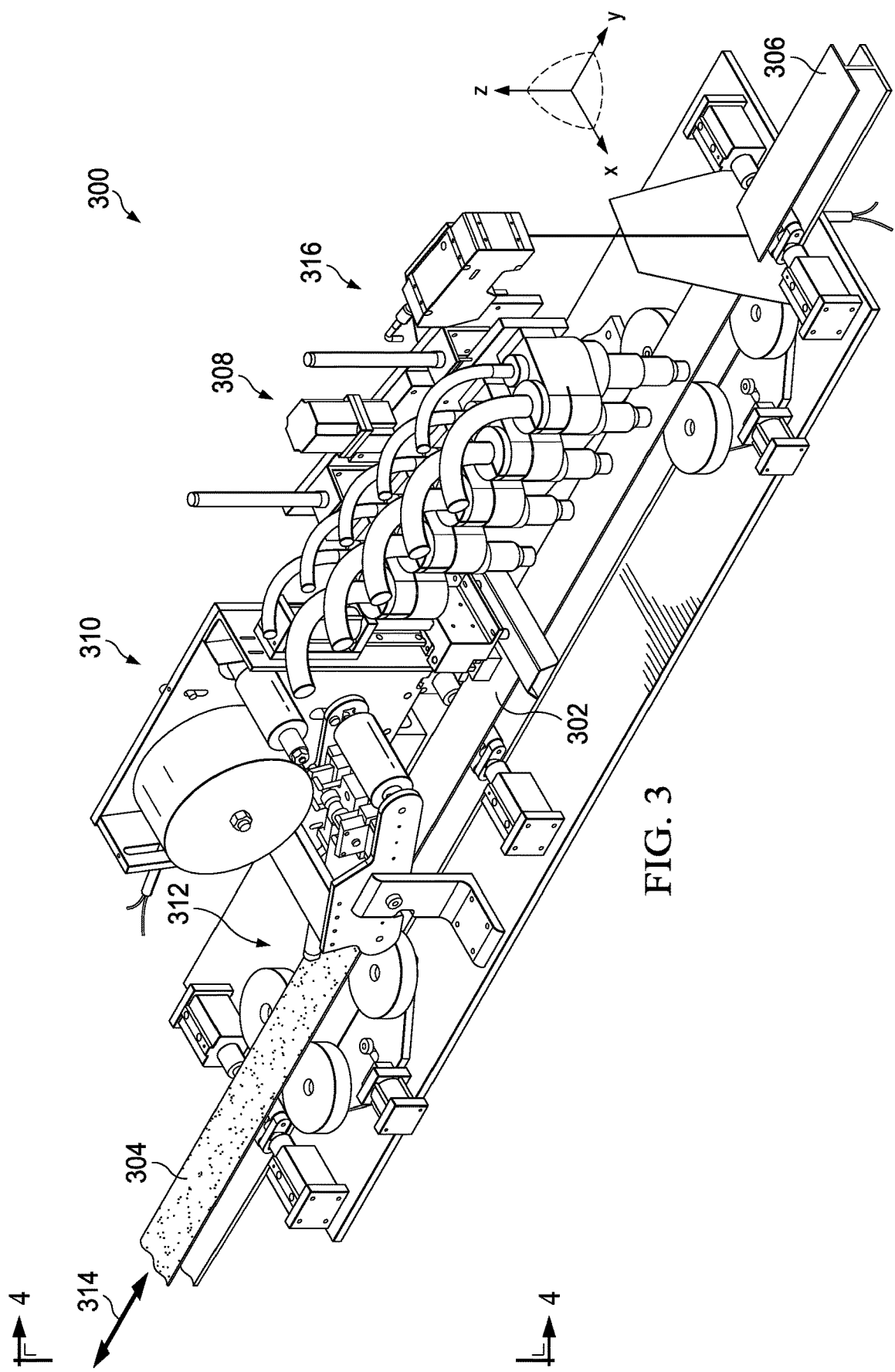
FIG. 3 is an illustration of an isometric view of a system for treating a surface and applying adhesive to an already treated portion of the surface in accordance with an illustrative embodiment.

Turning now to FIG. 3, an illustration of an isometric view of a system for treating a surface and applying adhesive to an already treated portion of the surface is depicted in accordance with an illustrative embodiment. System 300 is a physical implementation of system 202 of FIG. 2. System 300 treats surface 302 and applies adhesive 304 to surface 302 of elongated member 306. System 300 comprises surface treatment equipment 308, adhesive application equipment 310, and common feed system 312.

Common feed system 312 feeds elongated member 306 through system 300. Common feed system 312 feeds elongated member 306 in direction 314 through system 300. System 300 comprises common feed system 312 for feeding elongated member 306 beneath surface treatment equipment 308 and adhesive application equipment 310 concurrently. Common feed system 312 for feeding elongated member 306 beneath surface treatment equipment 308 and adhesive application equipment 310 concurrently feeds elongated member 306 beneath surface treatment equipment 308 and adhesive application equipment 310 at a common rate.

Surface treatment equipment 308 treats surface 302 of elongated member 306 as common feed system 312 feeds elongated member 306 beneath surface treatment equipment 308. As depicted, surface treatment equipment 308 takes the form of atmospheric pressure plasma treatment equipment 316. Atmospheric pressure plasma treatment equipment 316 treats surface 302 with atmospheric pressure plasma.

Adhesive application equipment 310 applies adhesive 304 to surface 302 as common feed system 312 feeds elongated member 306 beneath adhesive application equipment 310. Adhesive 304 is applied to a portion of surface 302 after treating the portion of surface 302.

Figure 4:
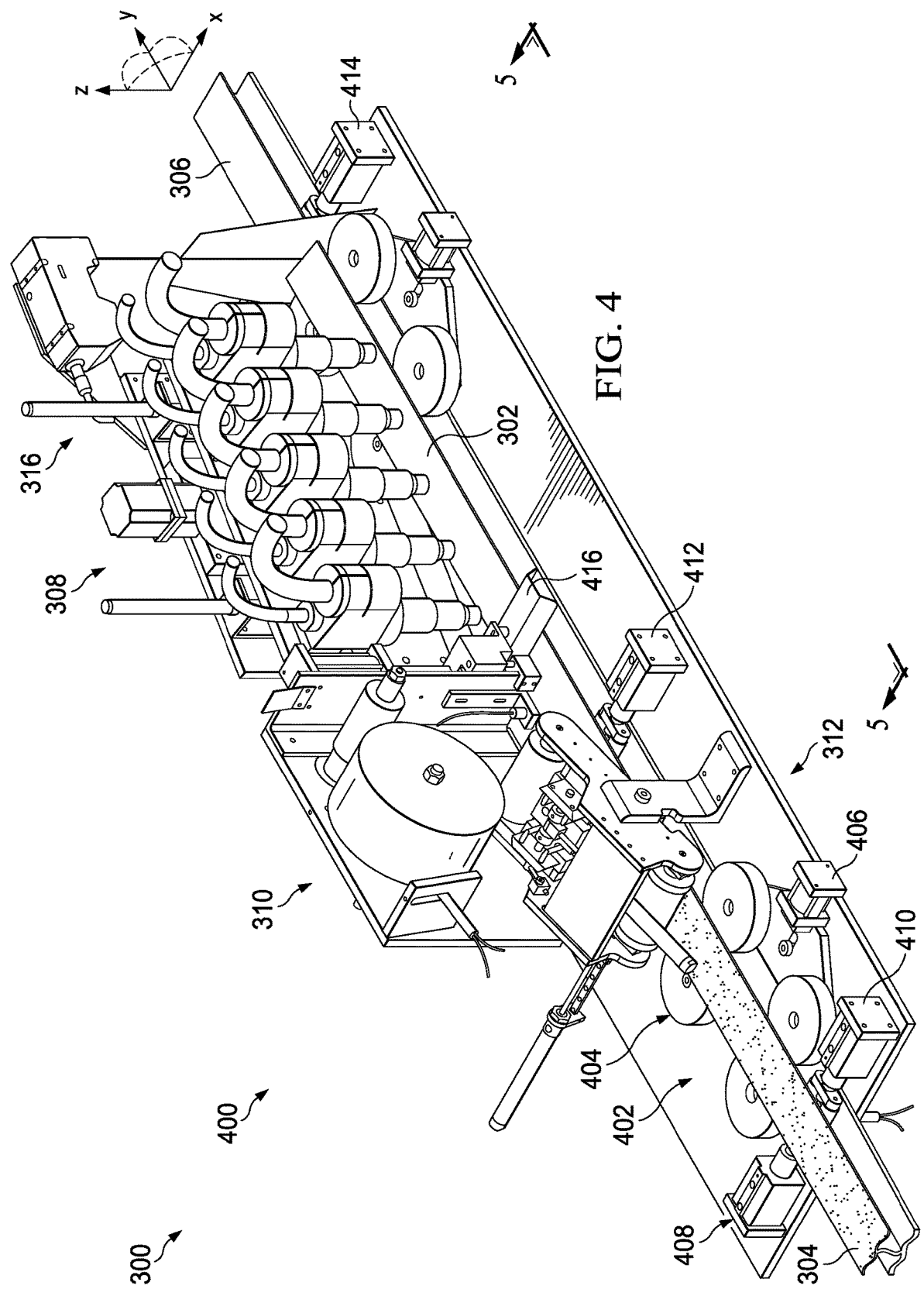
FIG. 4 is an illustration of a perspective view of a system for treating a surface and applying adhesive to an already treated portion of the surface in accordance with an illustrative embodiment.

Turning now to FIG. 4, an illustration of a perspective view of a system for treating a surface and applying adhesive to an already treated portion of the surface is depicted in accordance with an illustrative embodiment. Perspective view 400 is a view of system 300 from direction 4 of FIG. 3.

Common feed system 312 controls the constant rate that elongated member 306 is fed beneath surface treatment equipment 308 and adhesive application equipment 310. Common feed system 312 centers the constant rate of elongated member 306 relative to surface treatment equipment 308 and adhesive application equipment 310.

Drive equipment 402 of common feed system 312 feeds elongated member 306 through system 300. Drive equipment 402 includes plurality of drive wheels 404 and indexing equipment 406.

Common feed system 312 also comprises number of roller systems 408. Number of roller systems 408 includes rollers 410, rollers 412, and rollers 414.

In view 400, optional heater 416 is present. In some illustrative examples, optional heater 416 may be used to provide heat for application of adhesive 304. Heat increases the tack of adhesive 304.

As depicted, applying adhesive 304 to an already treated portion of surface 302 of elongated member 306 occurs in immediate succession after treating surface 302. In some illustrative examples, additional heat is not provided between treating surface 302 and applying adhesive 304. In these illustrative examples, optional heater 416 is either not present or not used during application of adhesive 304.

Figure 5:
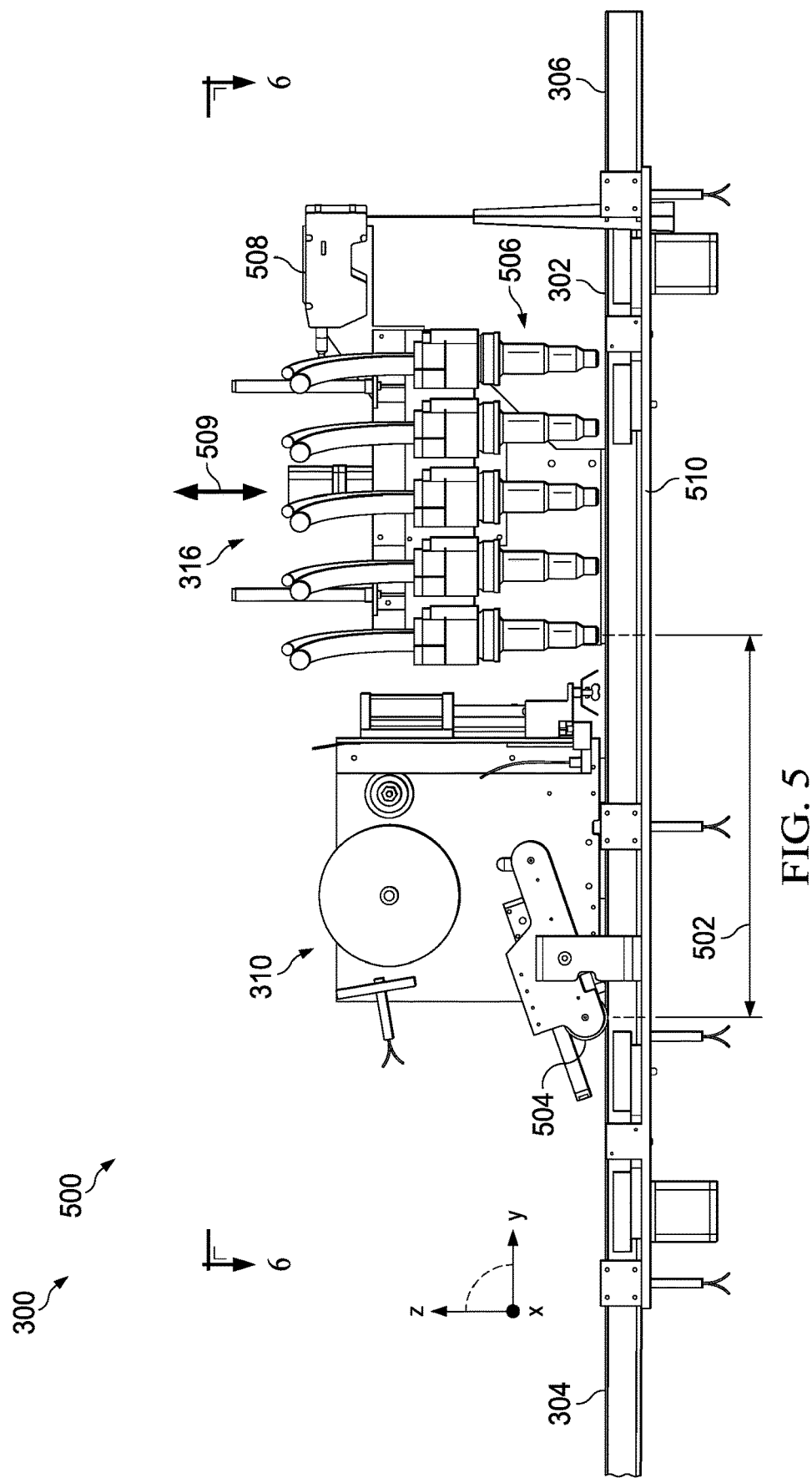
FIG. 5 is an illustration of a side view of a system for treating a surface and applying adhesive to an already treated portion of the surface in accordance with an illustrative embodiment.

Turning now to FIG. 5, an illustration of a side view of a system for treating a surface and applying adhesive to an already treated portion of the surface is depicted in accordance with an illustrative embodiment. Side view 500 is a view of system 300 from direction 5 of FIG. 4.

In this illustrative example, distance 502 between atmospheric pressure plasma treatment equipment 316 and adhesive application equipment 310 is sufficiently small such that heat generated on surface 302 by atmospheric pressure plasma treatment equipment 316 increases the tack of adhesive 304. Distance 502 is measured from compaction roller 504 to nozzles 506.

Distance sensor 508 is visible in side view 500. In operation, distance sensor 508 measures distance from distance sensor 508 to surface 302 of elongated member 306. Measurements from distance sensor 508 are used to determine distance from nozzles 506 to surface 302 of elongated member 306. Measurements from distance sensor 508 are used to determine if atmospheric pressure plasma treatment equipment 316 should be moved upward or downward in direction 509 relative to base 510. In some illustrative examples, the distance from nozzles 506 to surface 302 is desirably 0.50 inches, ±0.10 inches.

Figure 6:
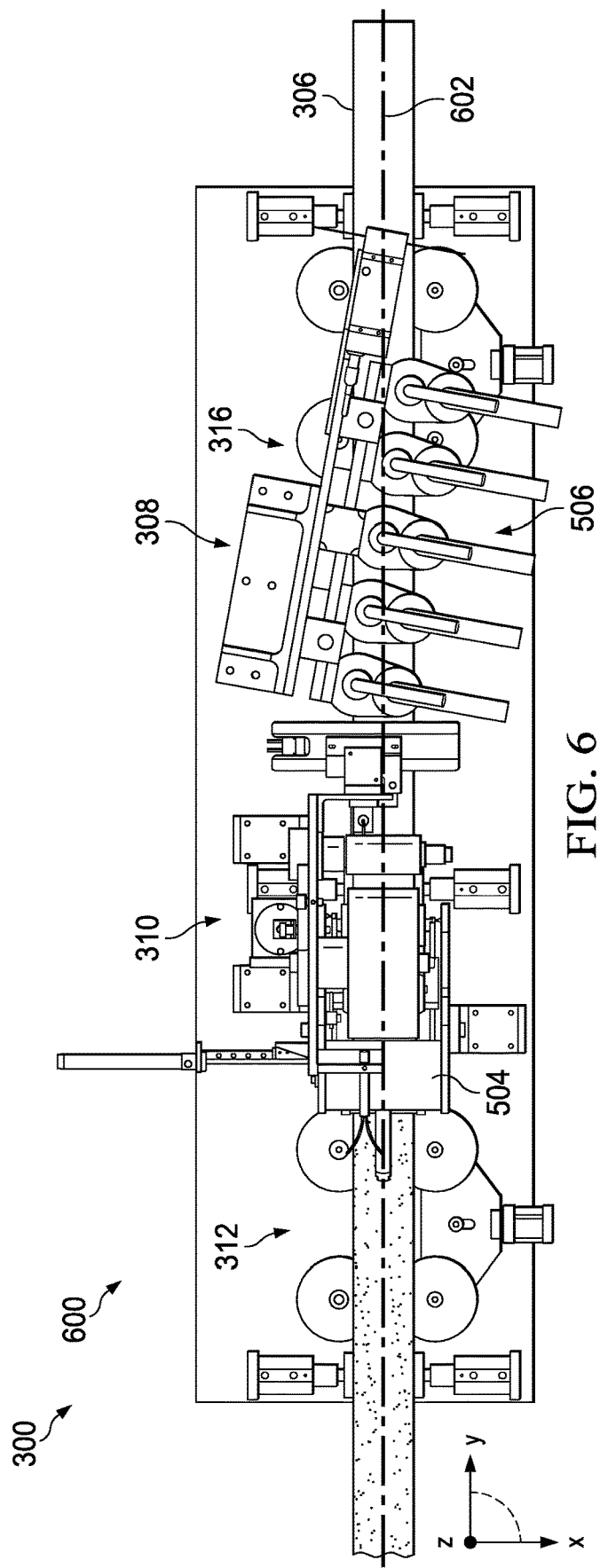
FIG. 6 is an illustration of a top view of a system for treating a surface and applying adhesive to an already treated portion of the surface in accordance with an illustrative embodiment.

Turning now to FIG. 6, an illustration of a top view of a system for treating a surface and applying adhesive to an already treated portion of the surface is depicted in accordance with an illustrative embodiment. Top view 600 is a view of system 300 from direction 6 of FIG. 5.

As depicted, common feed system 312 centers elongated member 306 relative to surface treatment equipment 308 and adhesive application equipment 310. As depicted, nozzles 506 are offset at an angle relative to centerline 602 of elongated member 306. By being offset, all of surface 302 will be affected by surface treatment equipment 308 in the form of atmospheric pressure plasma treatment equipment 316.

In some illustrative examples, common feed system 312 feeds elongated member 306 beneath atmospheric pressure plasma treatment equipment 316 and adhesive application equipment 310 at a rate in a range of one inches per second to ten inches per second and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of three inches per second to eight inches per second and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of one inch per second to six inches per second and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of one inch per second to six inches per second and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of one inch per second to six inches per second and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of five inches per second to six inches per second and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of five inches per second to six inches per second and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of five inches per second to six inches per second and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate of approximately five inches per second and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate of approximately five inches per second and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate of approximately five inches per second and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of one inches per second to ten inches per second, input pressure for nozzles 506 of atmospheric pressure plasma treatment equipment 316 is in the range of about 50 psi to about 90 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, input pressure for nozzles 506 of atmospheric pressure plasma treatment equipment 316 is in the range of about 50 psi to about 90 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, input pressure for nozzles 506 of atmospheric pressure plasma treatment equipment 316 is in the range of about 50 psi to about 90 psi, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of three inches per second to eight inches per second, input pressure for nozzles 506 of atmospheric pressure plasma treatment equipment 316 is in the range of about 50 psi to about 90 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of five inches per second to six inches per second, input pressure for nozzles 506 of atmospheric pressure plasma treatment equipment 316 is in the range of about 50 psi to about 90 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of five inches per second to six inches per second, input pressure for nozzles 506 of atmospheric pressure plasma treatment equipment 316 is in the range of about 50 psi to about 90 psi, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of five inches per second to six inches per second, input pressure for nozzles 506 of atmospheric pressure plasma treatment equipment 316 is in the range of about 50 psi to about 90 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate of approximately five inches per second, input pressure for nozzles 506 of atmospheric pressure plasma treatment equipment 316 is in the range of about 50 psi to about 90 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate of approximately five inches per second, input pressure for nozzles 506 of atmospheric pressure plasma treatment equipment 316 is in the range of about 50 psi to about 90 psi, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate of approximately five inches per second, input pressure for nozzles 506 of atmospheric pressure plasma treatment equipment 316 is in the range of about 50 psi to about 90 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of one inches per second to ten inches per second, the speed of nozzles 506 of atmospheric pressure plasma treatment equipment 316 in rpm is in the range of 2400 rpm to 3200 rpm, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, the speed of nozzles 506 of atmospheric pressure plasma treatment equipment 316 in rpm is in the range of 2400 rpm to 3200 rpm, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, the speed of nozzles 506 of atmospheric pressure plasma treatment equipment 316 in rpm is in the range of 2400 rpm to 3200 rpm, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of three inches per second to eight inches per second, the speed of nozzles 506 of atmospheric pressure plasma treatment equipment 316 in rpm is in the range of 2400 rpm to 3200 rpm, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of five inches per second to six inches per second, the speed of nozzles 506 of atmospheric pressure plasma treatment equipment 316 in rpm is in the range of 2400 rpm to 3200 rpm, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of five inches per second to six inches per second, the speed of nozzles 506 of atmospheric pressure plasma treatment equipment 316 in rpm is in the range of 2400 rpm to 3200 rpm, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of five inches per second to six inches per second, the speed of nozzles 506 of atmospheric pressure plasma treatment equipment 316 in rpm is in the range of 2400 rpm to 3200 rpm, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate of approximately five inches per second, the speed of nozzles 506 of atmospheric pressure plasma treatment equipment 316 in rpm is in the range of 2400 rpm to 3200 rpm, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate of approximately five inches per second, the speed of nozzles 506 of atmospheric pressure plasma treatment equipment 316 in rpm is in the range of 2400 rpm to 3200 rpm, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate of approximately five inches per second, the speed of nozzles 506 of atmospheric pressure plasma treatment equipment 316 in rpm is in the range of 2400 rpm to 3200 rpm, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of one inches per second to ten inches per second, the speed of nozzles 506 of atmospheric pressure plasma treatment equipment 316 in rpm is desirably 2800 rpm, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, the speed of nozzles 506 of atmospheric pressure plasma treatment equipment 316 in rpm is desirably 2800 rpm, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, the speed of nozzles 506 of atmospheric pressure plasma treatment equipment 316 in rpm is desirably 2800 rpm, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of three inches per second to eight inches per second, the speed of nozzles 506 of atmospheric pressure plasma treatment equipment 316 in rpm is desirably 2800 rpm, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of five inches per second to six inches per second, the speed of nozzles 506 of atmospheric pressure plasma treatment equipment 316 in rpm is desirably 2800 rpm, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of five inches per second to six inches per second, the speed of nozzles 506 of atmospheric pressure plasma treatment equipment 316 in rpm is desirably 2800 rpm, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of five inches per second to six inches per second, the speed of nozzles 506 of atmospheric pressure plasma treatment equipment 316 in rpm is desirably 2800 rpm, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate of approximately five inches per second, the speed of nozzles 506 of atmospheric pressure plasma treatment equipment 316 in rpm is desirably 2800 rpm, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate of approximately five inches per second, the speed of nozzles 506 of atmospheric pressure plasma treatment equipment 316 in rpm is desirably 2800 rpm, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate of approximately five inches per second, the speed of nozzles 506 of atmospheric pressure plasma treatment equipment 316 in rpm is desirably 2800 rpm, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of one inches per second to ten inches per second, the system clamp up of elongated member 306 is in the range of 65 psi to 95 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, the system clamp up of elongated member 306 is in the range of 65 psi to 95 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, the system clamp up of elongated member 306 is in the range of 65 psi to 95 psi, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of three inches per second to eight inches per second, the system clamp up of elongated member 306 is in the range of 65 psi to 95 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of five inches per second to six inches per second, the system clamp up of elongated member 306 is in the range of 65 psi to 95 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of five inches per second to six inches per second, the system clamp up of elongated member 306 is in the range of 65 psi to 95 psi, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of five inches per second to six inches per second, the system clamp up of elongated member 306 is in the range of 65 psi to 95 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate of approximately five inches per second, the system clamp up of elongated member 306 is in the range of 65 psi to 95 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate of approximately five inches per second, the system clamp up of elongated member 306 is in the range of 65 psi to 95 psi, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate of approximately five inches per second, the system clamp up of elongated member 306 is in the range of 65 psi to 95 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of one inches per second to ten inches per second, the system clamp up of elongated member 306 is desirably about 80 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, the system clamp up of elongated member 306 is desirably about 80 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, the system clamp up of elongated member 306 is desirably about 80 psi, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of three inches per second to eight inches per second, the system clamp up of elongated member 306 is desirably about 80 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of five inches per second to six inches per second, the system clamp up of elongated member 306 is desirably about 80 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of five inches per second to six inches per second, the system clamp up of elongated member 306 is desirably about 80 psi, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of five inches per second to six inches per second, the system clamp up of elongated member 306 is desirably about 80 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate of approximately five inches per second, the system clamp up of elongated member 306 is desirably about 80 psi, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate of approximately five inches per second, the system clamp up of elongated member 306 is desirably about 80 psi, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate of approximately five inches per second, the system clamp up of elongated member 306 is desirably about 80 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of one inches per second to ten inches per second, atmospheric pressure plasma treatment equipment 316 is configured such that heat generated on surface 302 of elongated member 306 is between 105 degrees Fahrenheit and 140 degrees Fahrenheit, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, atmospheric pressure plasma treatment equipment 316 is configured such that heat generated on surface 302 of elongated member 306 is between 105 degrees Fahrenheit and 140 degrees Fahrenheit, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of three inches per second to eight inches per second, atmospheric pressure plasma treatment equipment 316 is configured such that heat generated on surface 302 of elongated member 306 is between 105 degrees Fahrenheit and 140 degrees Fahrenheit, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of three inches per second to eight inches per second, atmospheric pressure plasma treatment equipment 316 is configured such that heat generated on surface 302 of elongated member 306 is between 105 degrees Fahrenheit and 140 degrees Fahrenheit, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of five inches per second to six inches per second, atmospheric pressure plasma treatment equipment 316 is configured such that heat generated on surface 302 of elongated member 306 is between 105 degrees Fahrenheit and 140 degrees Fahrenheit, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate in a range of five inches per second to six inches per second, atmospheric pressure plasma treatment equipment 316 is configured such that heat generated on surface 302 of elongated member 306 is between 105 degrees Fahrenheit and 140 degrees Fahrenheit, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate in a range of five inches per second to six inches per second, atmospheric pressure plasma treatment equipment 316 is configured such that heat generated on surface 302 of elongated member 306 is between 105 degrees Fahrenheit and 140 degrees Fahrenheit, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate of approximately five inches per second, atmospheric pressure plasma treatment equipment 316 is configured such that heat generated on surface 302 of elongated member 306 is between 105 degrees Fahrenheit and 140 degrees Fahrenheit, and compaction roller 504 of adhesive application equipment 310 applies pressure in the range of 35 psi to 55 psi.

In some illustrative examples, common feed system 312 feeds elongated member 306 beneath atmospheric pressure plasma treatment equipment 316 and adhesive application equipment 310 at a rate of approximately five inches per second, atmospheric pressure plasma treatment equipment 316 is configured such that heat generated on surface 302 of elongated member 306 is between 105 degrees Fahrenheit and 140 degrees Fahrenheit, and compaction roller 504 of adhesive application equipment 310 applies pressure in the range of 40 psi to 50 psi.

In some illustrative examples, common feed system 312 feeds elongated member 306 beneath atmospheric pressure plasma treatment equipment 316 and adhesive application equipment 310 at a rate of approximately five inches per second, atmospheric pressure plasma treatment equipment 316 is configured such that heat generated on surface 302 of elongated member 306 is between 105 degrees Fahrenheit and 140 degrees Fahrenheit, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate of approximately five inches per second, atmospheric pressure plasma treatment equipment 316 is configured such that heat generated on surface 302 of elongated member 306 is about 120 degrees Fahrenheit, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate of approximately five inches per second, atmospheric pressure plasma treatment equipment 316 is configured such that heat generated on surface 302 of elongated member 306 is between 105 degrees Fahrenheit and 140 degrees Fahrenheit, the input pressure for nozzles 506 of atmospheric pressure plasma treatment equipment 316 is in the range of about 50 psi to about 90 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate of approximately five inches per second, atmospheric pressure plasma treatment equipment 316 is configured such that heat generated on surface 302 of elongated member 306 is between 105 degrees Fahrenheit and 140 degrees Fahrenheit, the speed of nozzles 506 in rpm is in the range of 2400 rpm to 3200 rpm, the input pressure for nozzles 506 is in the range of about 50 psi to about 90 psi, and compaction roller 504 of adhesive application equipment 310 applies pressure at approximately 45 psi.

In some illustrative examples, common feed system 312 feeds elongated member 306 beneath atmospheric pressure plasma treatment equipment 316 and adhesive application equipment 310 at a rate in a range of one inch per second to ten inches per second, atmospheric pressure plasma treatment equipment 316 is configured such that heat generated on surface 302 of elongated member 306 is between 105 degrees Fahrenheit and 140 degrees Fahrenheit, the speed of nozzles 506 of atmospheric pressure plasma treatment equipment 316 in rpm is in the range of 2400 rpm to 3200 rpm, the input pressure for nozzles 506 is in the range of about 50 psi to about 90 psi, the system clamp up of elongated member 306 is in the range of 65 psi to 95 psi, distance of nozzles 506 from surface 302 is 0.50 inches ±0.10 inches, the overlap of nozzles 506 is set at 0.20 inches, ±0.05 inches, vacuum of 18 to 24 inches of Hg is provided for a feed and cut sequence of adhesive application equipment 310, and compaction roller 504 of adhesive application equipment 310 applies pressure 256 in the range of 35 psi to 55 psi.

In some illustrative examples, common feed system 312 feeds elongated member 306 beneath atmospheric pressure plasma treatment equipment 316 and adhesive application equipment 310 at a rate of approximately five inches per second, atmospheric pressure plasma treatment equipment 316 is configured such that heat generated on surface 302 of elongated member 306 is between 105 degrees Fahrenheit and 140 degrees Fahrenheit, the speed of nozzles 506 of atmospheric pressure plasma treatment equipment 316 in rpm is in the range of 2400 rpm to 3200 rpm, the input pressure for nozzles 506 is in the range of about 50 psi to about 90 psi, the system clamp up of elongated member 306 is in the range of 65 psi to 95 psi, distance of nozzles 506 from surface 302 is 0.50 inches ±0.10 inches, the overlap of nozzles 506 is set at 0.20 inches, ±0.05 inches, vacuum of 18 to 24 inches of Hg is provided for a feed and cut sequence of adhesive application equipment 310, and compaction roller 504 of adhesive application equipment 310 applies pressure 256 at approximately 45 psi.

In some illustrative examples, common feed system 312 feeds elongated member 306 beneath atmospheric pressure plasma treatment equipment 316 and adhesive application equipment 310 at a rate of approximately five inches per second, atmospheric pressure plasma treatment equipment 316 is configured such that heat generated on surface 302 of elongated member 306 is about 122 degrees Fahrenheit, the speed of nozzles 506 of atmospheric pressure plasma treatment equipment 316 in rpm is about 2800 rpm, the input pressure for nozzles 506 is in the range of about 50 psi to about 90 psi, the system clamp up of elongated member 306 is approximately 80 psi, distance of nozzles 506 from surface 302 is 0.50 inches ±0.10 inches, the overlap of nozzles 506 is set at 0.20 inches, ±0.05 inches, vacuum of about 22 inches of Hg provided for a feed and cut sequence of adhesive application equipment 310, and compaction roller 504 of adhesive application equipment 310 applies pressure 256 at approximately 45 psi.

Figure 7:
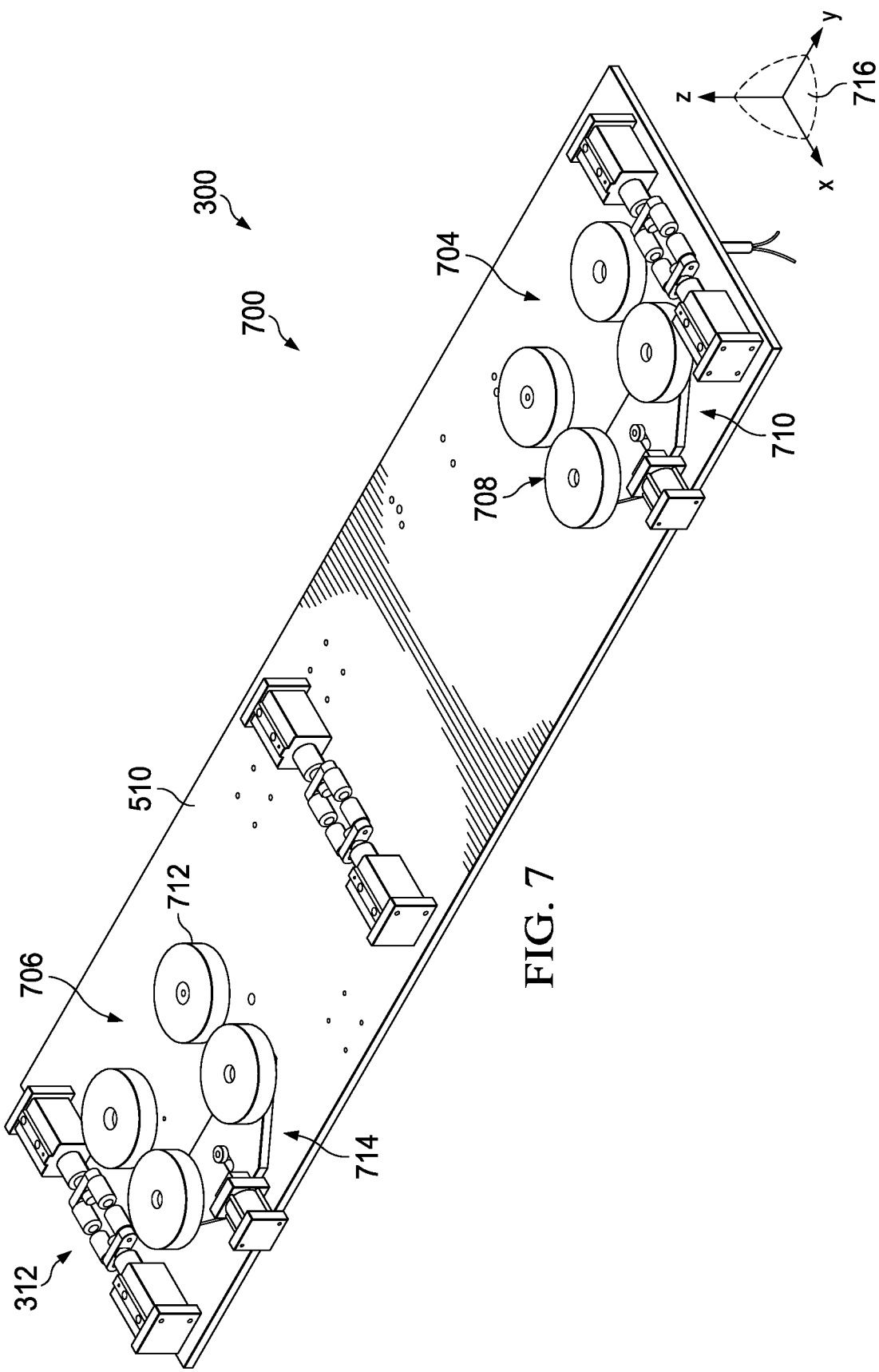
FIG. 7 is an illustration of an isometric view of a common feed system for use in a system for treating a surface and applying adhesive to an already treated portion of the surface in accordance with an illustrative embodiment.
Figure 8:
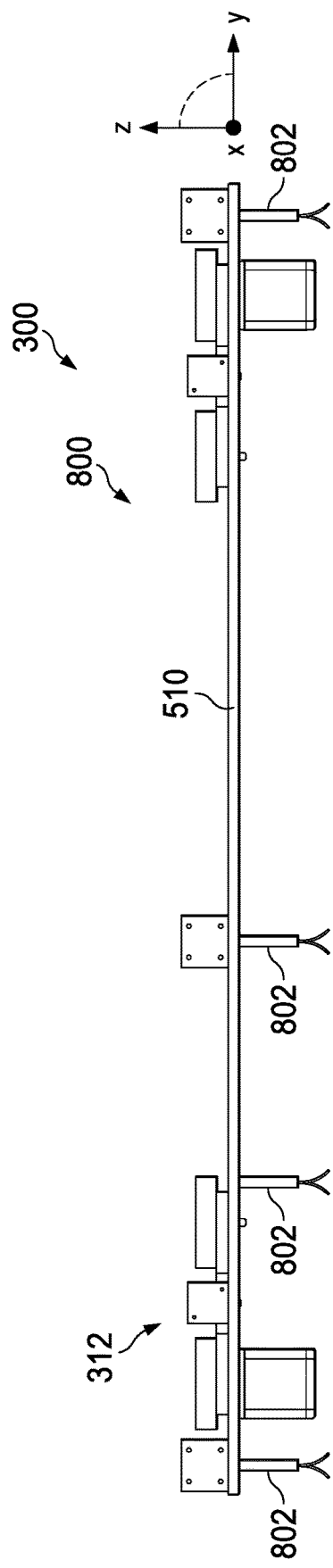
FIG. 8 is an illustration of a side view of a common feed system for use in a system for treating a surface and applying adhesive to an already treated portion of the surface in accordance with an illustrative embodiment.
Figure 9:
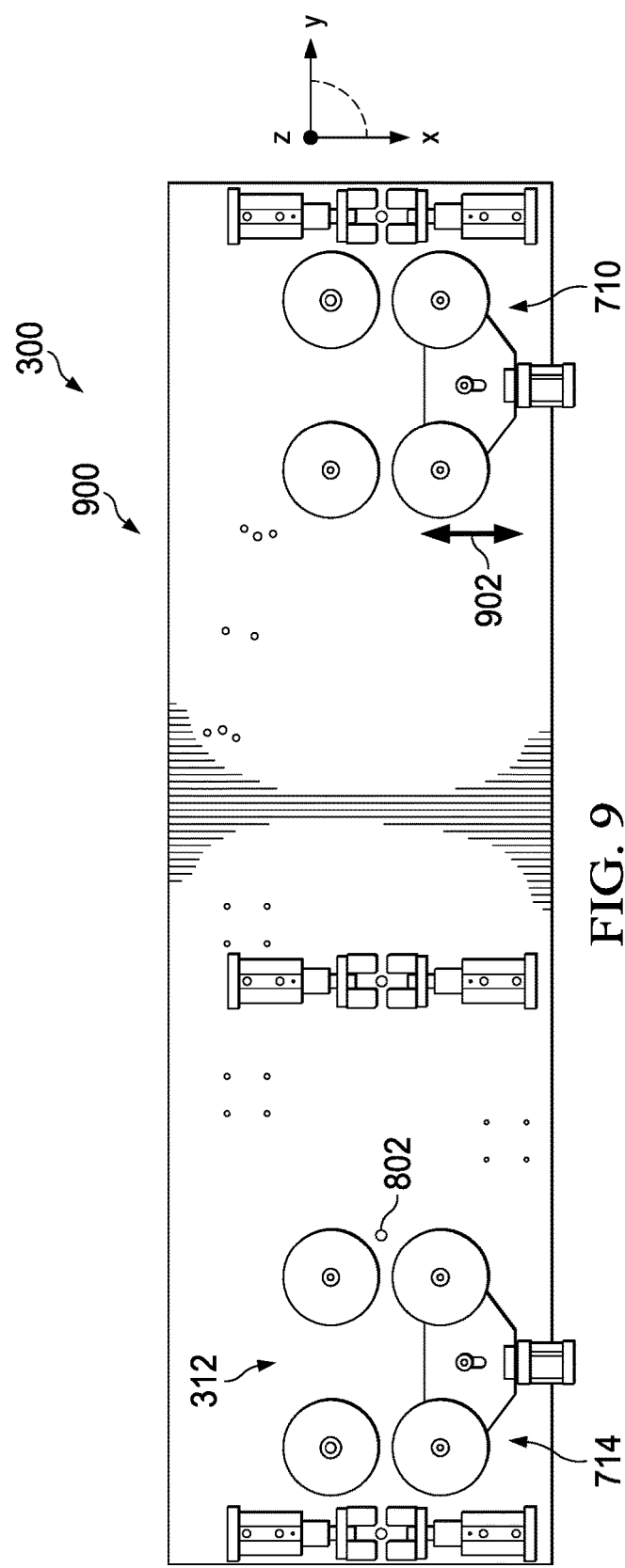
FIG. 9 is an illustration of a top view of a common feed system for use in a system for treating a surface and applying adhesive to an already treated portion of the surface in accordance with an illustrative embodiment.

With reference now to FIGS. 7-9, components of a common feed system are depicted. The simplified views in FIGS. 7-9 are shown independent of any associated utilities or mechanical supports. FIGS. 7-9 are intended to provide a basic depiction of one illustrative example of a common feed system. In operation, the common feed system of FIGS. 7-9 would be associated with at least one of electrical lines, communication lines, or a support table.

Turning now to FIG. 7, an illustration of an isometric view of a common feed system for use in a system for treating a surface and applying adhesive to an already treated portion of the surface is depicted in accordance with an illustrative embodiment. In view 700, common feed system 312 of system 300 is depicted without surface treatment equipment 308 or adhesive application equipment 310 of FIGS. 3-6 for simplicity.

Common feed system 312 is connected to base 510. Common feed system 312 includes inlet drive equipment 704 and outlet drive equipment 706. Inlet drive equipment 704 includes drive wheels 708 and retractable wheel assembly 710. Outlet drive equipment 706 includes drive wheels 712 and retractable wheel assembly 714.

Inlet drive equipment 704 and outlet drive equipment 706 may at least one of push or pull elongated member 306 through system 300. Inlet drive equipment 704 and outlet drive equipment 706 center an elongated member (not depicted in FIG. 7) relative to horizontal plane 716. Drive wheels 708 and drive wheels 712 are driven by variable speed motors beneath base 510.

Turning now to FIG. 8, an illustration of a side view of a common feed system for use in a system for treating a surface and applying adhesive to an already treated portion of the surface is depicted in accordance with an illustrative embodiment. In side view 800, common feed system 312 of system 300 is depicted without surface treatment equipment 308 or adhesive application equipment 310 of FIGS. 3-6 for simplicity.

Indexing sensors 802 are visible in side view 800. Each of indexing sensors 802 are attached to base 510. Indexing sensors 802 detect the location of and keep track of the leading and trailing edges of an elongated member (not depicted on FIG. 8) for proper indexing of the elongated member for processing, and the start and stop of system 300. Indexing sensors 802 extend through base 510.

Turning now to FIG. 9, an illustration of a top view of a common feed system for use in a system for treating a surface and applying adhesive to an already treated portion of the surface is depicted in accordance with an illustrative embodiment. In top view 900, common feed system 312 of system 300 is depicted without surface treatment equipment 308 or adhesive application equipment 310 of FIGS. 3-6 for simplicity. Top view 900 provides a vantage point for observing the distances between the components of common feed system 312 and the interaction between indexing sensors 802 and common feed system 312. Top view 900 also provides a vantage point for direction 902 of movement for retractable wheel assembly 710 and retractable wheel assembly 714.

The different components shown in FIG. 1 and FIGS. 3-9 may be combined with components in FIG. 2, used with components in FIG. 2, or a combination of the two. Additionally, some of the components in FIG. 1 and FIGS. 3-9 may be illustrative examples of how components shown in block form in FIG. 2 may be implemented as physical structures.

Turning now to FIG. 10, an illustration of a flowchart of a method for processing an elongated member is depicted in accordance with an illustrative embodiment. System 202 may use method 1000 to process elongated member 213 of FIG. 2. System 300 may use method 1000 to process elongated member 306 of FIG. 3.

Method 1000 simultaneously treats a surface of an elongated member and applies adhesive to an already treated portion of the surface of the elongated member by a system comprising surface treatment equipment and adhesive application equipment, wherein the system applies surface treatment to the surface in a continuous automated fashion and applies the adhesive to the already treated portion of the surface in a continuous automated fashion (operation 1002). Afterwards the method terminates.

Turning now to FIG. 11, an illustration of a flowchart of a method for processing an elongated member is depicted in accordance with an illustrative embodiment. System 202 may use method 1100 to process elongated member 213 of FIG. 2. System 300 may use method 1100 to process elongated member 306 of FIG. 3.

Method 1100 feeds an elongated member through a system using a common feed system (operation 1102). Method 1100 treats a surface of the elongated member using surface treatment equipment as the common feed system feeds the elongated member beneath the surface treatment equipment (operation 1104). In some illustrative examples, treating the surface of the elongated member using surface treatment equipment comprises treating the surface with atmospheric pressure plasma treatment equipment.

Method 1100 applies an adhesive to the surface of the elongated member, wherein the adhesive is applied to a portion of the surface after treating the portion of the surface, wherein the adhesive is applied to the surface by adhesive application equipment as the common feed system feeds the elongated member beneath the adhesive application equipment (operation 1106). Afterwards, the method terminates.

In some illustrative examples, the adhesive is applied continuously onto the surface. In some illustrative examples, applying the adhesive comprises compacting the adhesive using between 35 pounds per square inch and 55 pounds per square inch of pressure.

In some illustrative examples, the surface of the elongated member is fed beneath the surface treatment equipment and the adhesive application equipment at a rate of between one inch per second and six inches per second. In some illustrative examples, the surface of the elongated member is fed continuously beneath the surface treatment equipment and the adhesive application equipment. In some illustrative examples, applying the adhesive to the surface of the elongated member occurs in immediate succession after treating the surface, and wherein additional heat is not provided between treating the surface and applying the adhesive.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, method 1000 may further comprise moving the elongated member through the system at a constant rate. In some illustrative examples, the constant rate is in a range of one inch per second to six inches per second.

Figure 12:
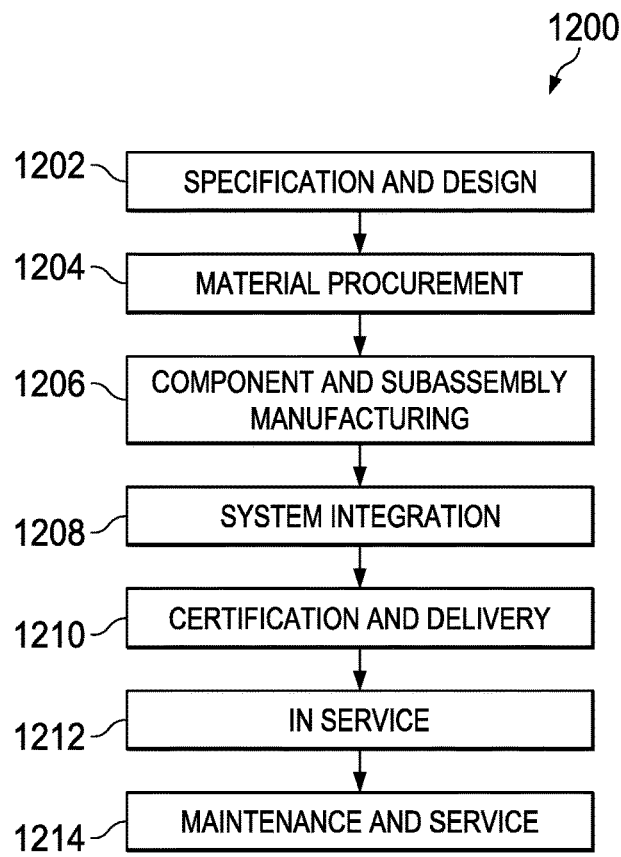
FIG. 12 is an illustration of an aircraft manufacturing and service method in the form of a block diagram in accordance with an illustrative embodiment.
Figure 13:
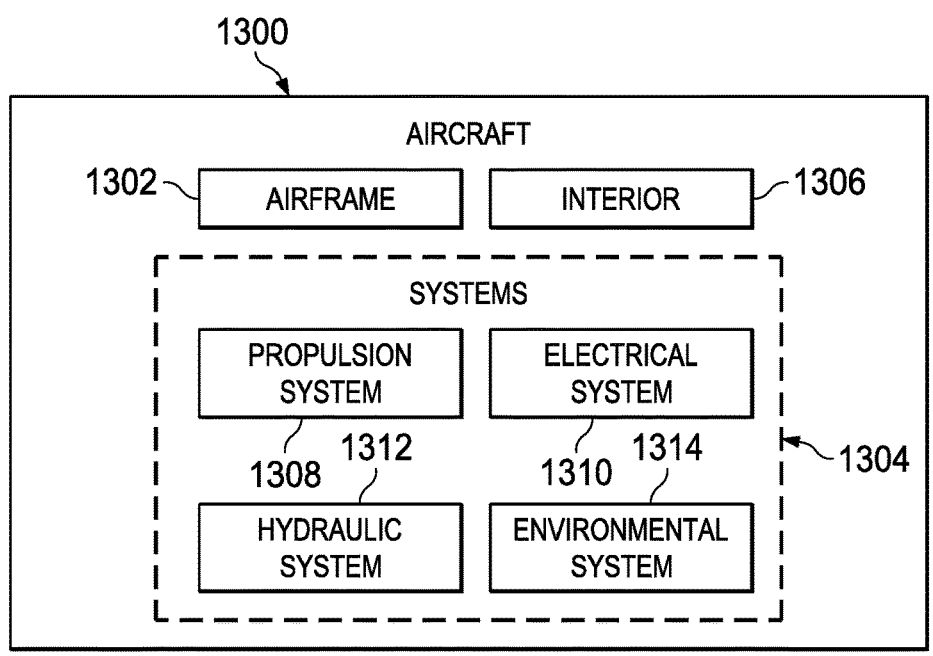
FIG. 13 is an illustration of an aircraft in the form of a block diagram in which an illustrative embodiment may be implemented.

Illustrative embodiments of the present disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During preproduction, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for routine maintenance and service 1213, which may include modification, reconfiguration, refurbishment, or other maintenance and service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 is produced by aircraft manufacturing and service method 1200 of FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

One or more illustrative embodiments may be used during at least one of component and subassembly manufacturing 1206, system integration 1208, or maintenance and service 1213 of FIG. 12. For example, system 202 of FIG. 2 may be used during component and subassembly manufacturing 1206 to apply adhesive 206 to elongated member 213 of FIG. 2. Elongated member 306 of FIG. 3 may be processed during component and subassembly manufacturing 1206 using at least one of method 1000 of FIG. 10 or method 1100 of FIG. 11.

Elongated member 213 may be connected to aircraft 1300 during system integration 1208. When elongated member 213 is a composite structure, elongated member 213 may be bonded to another composite structure during system integration 1208.

System 202 of FIG. 2 may be used to form replacement components used during maintenance and service 1213 of FIG. 12. For example, system 202 may process elongated member 213 to treat surface 204 and apply adhesive 206 to form replacement components used during maintenance and service 1213 of FIG. 12.

Elongated member 213 of FIG. 2 or elongated member 306 of FIG. 3 may be attached to airframe 1302. When an elongated member, such as elongated member 213 of FIG. 2 or elongated member 306 of FIG. 3 is a composite structure, it may be bonded to another composite structure using the adhesive applied, to attach the elongated member to airframe 1302.

The illustrative examples present a common feed system for surface treatment and adhesive application. The common feed system enables concurrent surface treatment and adhesive processing. In both the surface treatment and the adhesive application the elongated member is sent through a mounted system. Both the adhesive application equipment and surface treatment equipment are mounted.

Both the adhesive application equipment and surface treatment equipment are automated. The automation of atmospheric pressure plasma treatment and adhesive application will save touch labor and processing time. Further, the automation of atmospheric pressure plasma treatment and adhesive application will reduce or eliminate human intervention. Instead of having to manually feed the start sequence, the new system automates this process and requires little to no human intervention.

Additionally, in the illustrative examples, no human contact occurs with the free adhesive. The automated placement of the adhesive and a small distance between the atmospheric pressure plasma treatment equipment and the adhesive application equipment significantly reduces inconsistencies, such as foreign object debris (FOD).

In these illustrative examples, the system is static and the elongated members pass through it. The illustrative examples provide a combination of the two processes into one system with a common feeder, an automated cut/vacuum/shuttle sequence, and a resulting reduction of inconsistencies due to a reduction in distance and a reduction in manual handling of the adhesive. The new process is a completely automated system and process. The operator will insert an elongated member into one end of the system where a set of drive wheels will pull the structural component through both surface treatment and adhesive application stations in subsequent, automated steps. The beginning and stop/cut sequence of the adhesive application will also be completely automated. This affords multiple benefits, including reduced risk of inducing FOD, increased rate, more accurately placed adhesive, and a more robust process that combines multiple steps into a single streamlined process.

The illustrative examples eliminate time-consuming manual processing steps previously used to prepare the surface of an elongated member (i.e., a stringer or other similar structural component) for bonding. The illustrative examples replace conventional manual sweeping with adhesive application by an automated pass-through system. The illustrative examples do not include transfer steps between conventional atmospheric pressure plasma treatment equipment and the manual adhesive application. By removing transfer steps from manufacturing process, manufacturing time is reduced. The illustrative examples also reduce touch labor while increasing both rate and quality.

The illustrative examples increase reliability and increase repeatability over conventional processes and conventional tools. Further, the amount of equipment required is reduced from conventional systems by utilizing this pass-through system. The illustrative examples reduce manufacturing cost by reducing manufacturing time, reducing touch time by operators, reducing waste from vacuum bagging, and reducing rework or replacement due to inconsistencies.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for treating a surface and applying adhesive to an already treated portion of the surface concurrently, the system comprising:
    surface treatment equipment configured to treat the surface of an elongated member;
    adhesive application equipment configured to apply adhesive to the already treated portion of the surface; and
    a common feed system for feeding the elongated member beneath the surface treatment equipment and the adhesive application equipment concurrently, wherein the common feed system comprises:
        drive equipment having a plurality of wheels configured to contact the elongated member; and
        indexing equipment configured to center the elongated member beneath the surface treatment equipment and the adhesive application equipment, the indexing equipment comprising a retractable wheel assembly configured to move towards or away from a drive wheel of the drive equipment.

2. The system of claim 1, wherein the drive equipment includes inlet drive equipment and outlet drive equipment.

3. The system of claim 2, wherein the plurality of drive wheels includes a first drive wheel of the inlet drive equipment and a second drive wheel of the outlet drive equipment.

4. The system of claim 1, wherein the common feed system further comprises:
    a number of roller systems to support the elongated member.

5. The system of claim 4, wherein the common feed system is connected to a base.

6. The system of claim 1, wherein the common feed system feeds the elongated member beneath the surface treatment equipment and adhesive application equipment at a rate in a range of one inch per second to six inches per second.

7. The system of claim 1, wherein the surface treatment equipment comprises atmospheric pressure plasma treatment equipment.

8. The system of claim 7, wherein a distance between the atmospheric pressure plasma treatment equipment and the adhesive application equipment is sufficiently small such that heat generated on the surface by the atmospheric pressure plasma treatment equipment increases tack of the adhesive.

9. The system of claim 8, wherein the atmospheric pressure plasma treatment equipment is configured such that the heat generated on the surface is between 105 degrees Fahrenheit and 140 degrees Fahrenheit.

10. A method comprising:
    simultaneously treating a surface of an elongated member and applying adhesive to an already treated portion of the surface of the elongated member by a system comprising surface treatment equipment, adhesive application equipment, and a common feed system for feeding the elongated member beneath the surface treatment equipment and the adhesive application equipment concurrently, wherein the system applies a surface treatment to the surface in a continuous automated fashion and applies the adhesive to the already treated portion of the surface in a continuous automated fashion, wherein the common feed system includes a plurality of wheels configured to contact the elongated member and indexing equipment comprising a retractable wheel assembly configured to move towards or away from a drive wheel of the plurality of wheels.

11. The method of claim 10 further comprising:
    moving the elongated member through the system at a constant rate.

12. The method of claim 11, wherein the constant rate is in a range of one inch per second to six inches per second.

13. A method comprising:
    feeding an elongated member through a system using a common feed system;
    treating a surface of the elongated member using surface treatment equipment as the common feed system feeds the elongated member beneath the surface treatment equipment; and
    applying an adhesive to the surface of the elongated member, wherein the adhesive is applied to a portion of the surface after treating the portion of the surface, wherein the adhesive is applied to the surface by adhesive application equipment as the common feed system feeds the elongated member beneath the adhesive application equipment, wherein the common feed system includes a plurality of wheels configured to contact the elongated member and indexing equipment comprising a retractable wheel assembly configured to move towards or away from a drive wheel of the plurality of wheels.

14. The method of claim 13, wherein the elongated member is fed beneath the surface treatment equipment and the adhesive application equipment at a rate of between one inch per second and six inches per second.

15. The method of claim 13, wherein the elongated member is fed continuously beneath the surface treatment equipment and the adhesive application equipment.

16. The method of claim 13, wherein the adhesive is applied continuously onto the surface.

17. The method of claim 16, wherein applying the adhesive comprises compacting the adhesive using between 35 pounds per square inch and 55 pounds per square inch of pressure.

18. The method of claim 13, wherein treating the surface of the elongated member using the surface treatment equipment comprises treating the surface with atmospheric pressure plasma treatment equipment.

19. The method of claim 18, wherein applying the adhesive to the portion of the surface of the elongated member occurs in immediate succession after treating the portion of the surface, and wherein additional heat is not provided to the portion of the surface between treating the portion of the surface and applying the adhesive.

20. A system for treating a surface and applying adhesive to an already treated portion of the surface concurrently, the system comprising:
   surface treatment equipment configured to treat the surface of an elongated member;
   adhesive application equipment configured to apply adhesive to the already treated portion of the surface; and
   a common feed system for feeding the elongated member beneath the surface treatment equipment and the adhesive application equipment concurrently, wherein the common feed system feeds the elongated member beneath the surface treatment equipment and the adhesive application equipment at a rate in a range of one inch per second to ten inches per second, wherein the surface treatment equipment is configured such that heat generated on the surface of the elongated member is between 105 degrees Fahrenheit and 140 degrees Fahrenheit, wherein speed of nozzles of the surface treatment equipment in rpm is in a range of 2400 rpm to 3200 rpm, wherein an input pressure for the nozzles is in a range of about 50 psi to about 90 psi, wherein system clamp up of the elongated member is in a range of 65 psi to 95 psi, wherein distance of the nozzles from the surface is 0.50 inches ±0.10 inches, wherein overlap of the nozzles is set at 0.20 inches ±0.05 inches, wherein vacuum of 18 to 24 inches of Hg is provided for a feed and cut sequence of the adhesive application equipment, and wherein a compaction roller of the adhesive application equipment applies pressure in a range of 35 psi to 55 psi.

21. A system for treating a surface and applying adhesive to an already treated portion of the surface concurrently, the system comprising:
   surface treatment equipment configured to treat the surface of an elongated member;
   adhesive application equipment configured to apply adhesive to the already treated portion of the surface; and
   a common feed system for feeding the elongated member beneath the surface treatment equipment and the adhesive application equipment concurrently, wherein the common feed system feeds the elongated member beneath the surface treatment equipment and the adhesive application equipment at a rate in a range of five inches per second to six inches per second, wherein the surface treatment equipment is configured such that heat generated on the surface of the elongated member is between 105 degrees Fahrenheit and 140 degrees Fahrenheit, wherein speed of nozzles of the surface treatment equipment in rpm is in a range of 2400 rpm to 3200 rpm, wherein input pressure for the nozzles is in a range of about 50 psi to about 90 psi, wherein system clamp up of the elongated member is in a range of 65 psi to 95 psi, wherein distance of the nozzles from the surface is 0.50 inches ±0.10 inches, wherein overlap of the nozzles is set at 0.20 inches ±0.05 inches, wherein vacuum of 18 to 24 inches of Hg is provided for a feed and cut sequence of the adhesive application equipment, and wherein a compaction roller of the adhesive application equipment applies pressure in a range of 40 psi to 50 psi.

22. A system for treating a surface and applying adhesive to an already treated portion of the surface concurrently, the system comprising:
   surface treatment equipment configured to treat the surface of an elongated member;
   adhesive application equipment configured to apply adhesive to the already treated portion of the surface; and
   a common feed system for feeding the elongated member beneath the surface treatment equipment and the adhesive application equipment concurrently, wherein the common feed system feeds the elongated member beneath the surface treatment equipment and the adhesive application equipment at a rate of approximately five inches per second, wherein the surface treatment equipment is configured such that heat generated on the surface of the elongated member is about 122 degrees Fahrenheit, wherein speed of nozzles of the surface treatment equipment in rpm is about 2800 rpm, wherein input pressure for the nozzles is in a range of about 50 psi to about 90 psi, wherein system clamp up of the elongated member is approximately 80 psi, wherein distance of the nozzles from the surface is 0.50 inches ±0.10 inches, wherein overlap of the nozzles is set at 0.20 inches ±0.05 inches, wherein vacuum of about 22 inches of Hg is provided for a feed and cut sequence of the adhesive application equipment, and wherein a compaction roller of the adhesive application equipment applies pressure at approximately 45 psi.

* * * * *